(12) United States Patent
Chen et al.

(10) Patent No.: US 10,321,756 B1
(45) Date of Patent: Jun. 18, 2019

(54) METHOD AND APPARATUS OF A VERSATILE HOLDER AND STAND

(71) Applicants: Haw-Renn Chen, Moorpark, CA (US); Feichu H. Chen, Moorpark, CA (US)

(72) Inventors: Haw-Renn Chen, Moorpark, CA (US); Feichu H. Chen, Moorpark, CA (US)

( * ) Notice: Subject to any disclaimer, the term of this patent is extended or adjusted under 35 U.S.C. 154(b) by 259 days.

(21) Appl. No.: 14/756,561

(22) Filed: Sep. 16, 2015

(51) Int. Cl.
| | |
|---|---|
| *A47B 21/06* | (2006.01) |
| *F16M 11/24* | (2006.01) |
| *F16M 11/38* | (2006.01) |
| *A47B 49/00* | (2006.01) |
| *A47B 96/02* | (2006.01) |
| *B60B 33/00* | (2006.01) |
| *F16M 11/04* | (2006.01) |
| *H02J 7/00* | (2006.01) |
| *H02J 7/35* | (2006.01) |

(52) U.S. Cl.
CPC .............. *A47B 21/06* (2013.01); *A47B 49/00* (2013.01); *A47B 96/02* (2013.01); *B60B 33/0015* (2013.01); *F16M 11/04* (2013.01); *F16M 11/24* (2013.01); *F16M 11/38* (2013.01); *H02J 7/007* (2013.01); *H02J 7/355* (2013.01); *A47B 2021/066* (2013.01)

(58) Field of Classification Search
CPC ........... H02J 7/355; H02J 7/007; A47B 49/00; A47B 21/06; A47B 96/02; A47B 2021/066; B60B 33/0015; F16M 11/38; F16M 11/04; F16M 11/24
USPC ............ 248/441.1, 519, 121, 127, 424, 422, 248/176.1, 229.12, 229.22, 231.41, 316.4
See application file for complete search history.

(56) References Cited

U.S. PATENT DOCUMENTS

| | | | | |
|---|---|---|---|---|
| 4,170,336 | A * | 10/1979 | Malis | A61B 90/25 248/279.1 |
| 6,316,706 | B1 * | 11/2001 | Sammons | A47B 19/002 84/327 |
| 6,604,720 | B1 * | 8/2003 | Wilson | A47B 23/04 248/177.1 |
| 7,861,998 | B2 * | 1/2011 | Huang | F16M 11/105 248/125.1 |
| 8,727,192 | B2 * | 5/2014 | Lai | B60R 11/0241 224/282 |
| 9,052,057 | B2 * | 6/2015 | Stenhouse | F16M 11/041 |
| 2002/0066837 | A1 * | 6/2002 | Dunbar | A47B 19/002 248/122.1 |

(Continued)

*Primary Examiner* — Muhammad Ijaz

(57) ABSTRACT

A method and apparatus of a versatile holder and stand including a portable flat-panel mount, shelves as supporting means for storage conveniences and allowing multiple devices including energy generation devices and energy storage devices to be utilized at the same time, a low profile caster configuration enabling the position of a caster relative to a stand be able to be adjusted, supporting means having a number of curved columns to provide additional available spaces for supporting additional devices through various device holders or supporting means which include various types of device holding means that are capable of simultaneously holding multiple devices with different dimensions while cable management configurations being introduced separately or incorporated into these device holding means to enable cables used along with the portable devices held by any portions of the stand to be able to be placed and managed at any appropriate and desired locations and positions.

5 Claims, 17 Drawing Sheets

(56) References Cited

U.S. PATENT DOCUMENTS

| | | | | |
|---|---|---|---|---|
| 2012/0228441 A1* | 9/2012 | Ceron | ............... | F16M 11/24 |
| | | | | 248/125.7 |
| 2014/0183313 A1* | 7/2014 | McClain | ............ | F16M 11/041 |
| | | | | 248/229.12 |
| 2015/0359114 A1* | 12/2015 | Yang | ............... | F16M 11/041 |
| | | | | 248/161 |
| 2015/0374117 A1* | 12/2015 | Lozano | ............ | A47B 19/06 |
| | | | | 320/107 |

* cited by examiner

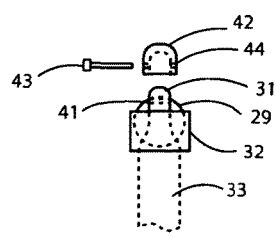
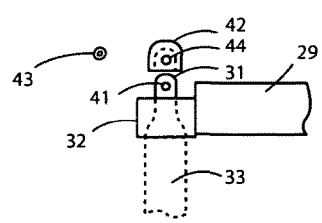
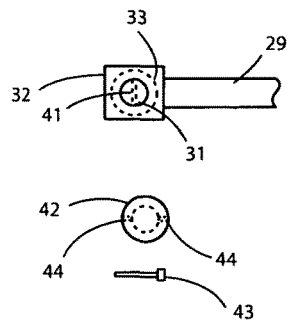
FIG. 16  FIG. 17  FIG. 18
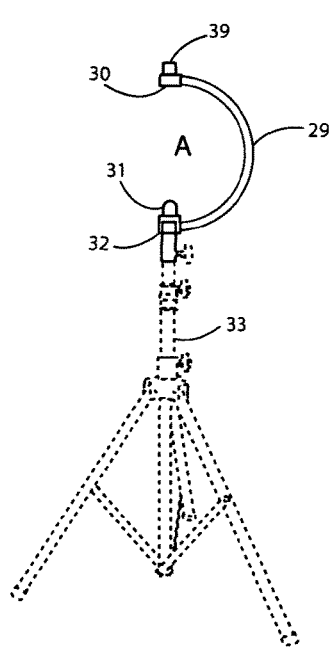
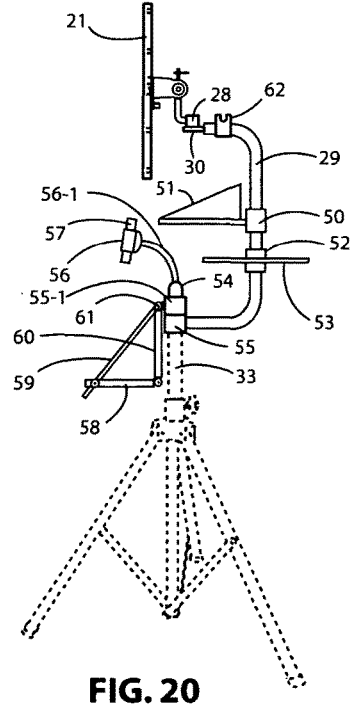
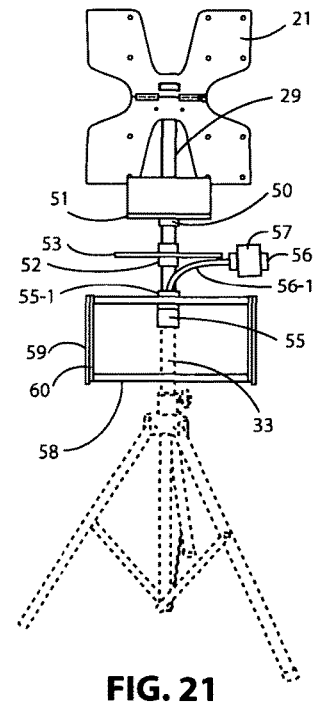
FIG. 19  FIG. 20  FIG. 21

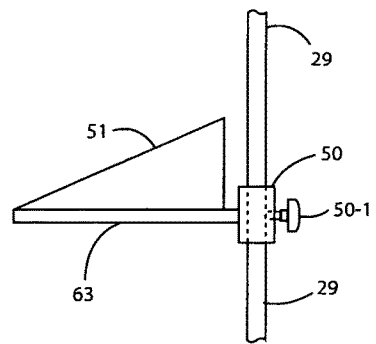
FIG. 22
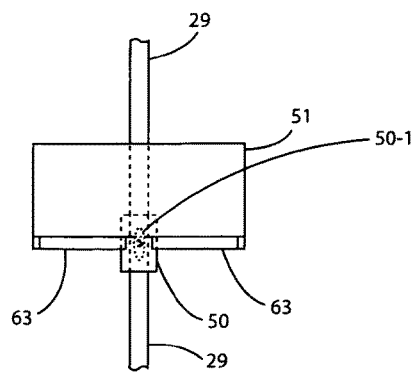
FIG. 23
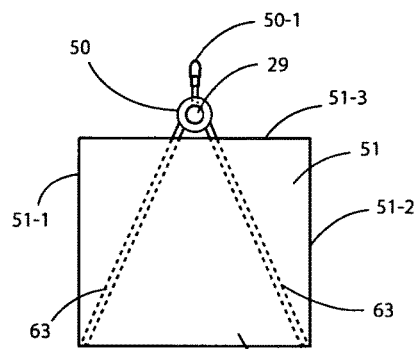
FIG. 24
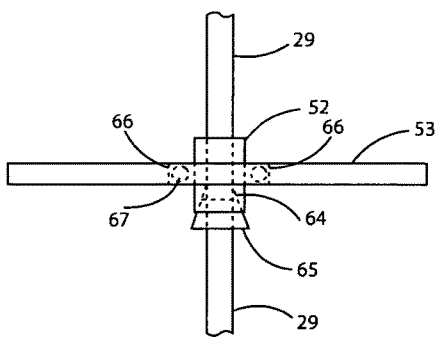
FIG. 25
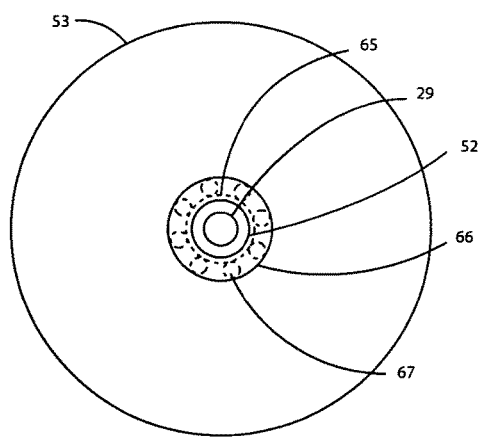
FIG. 26
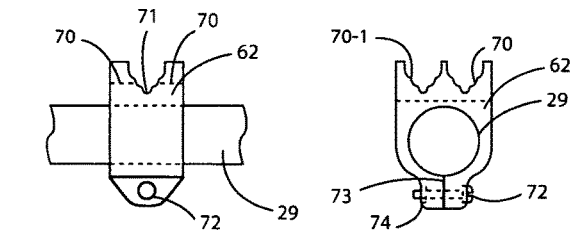
FIG. 27     FIG. 28
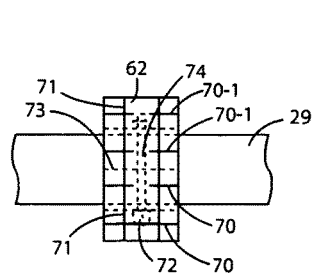 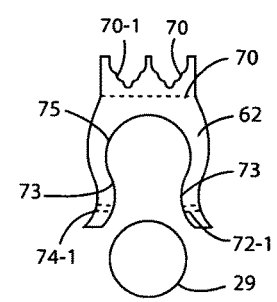
FIG. 29     FIG. 30

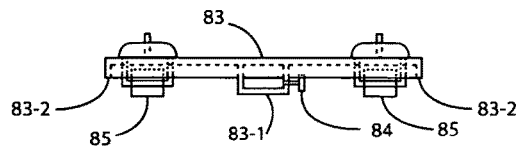
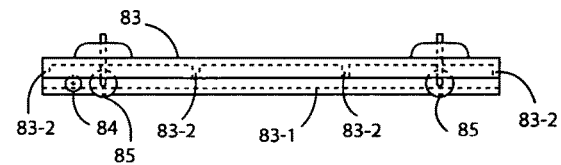
FIG. 60  FIG. 61
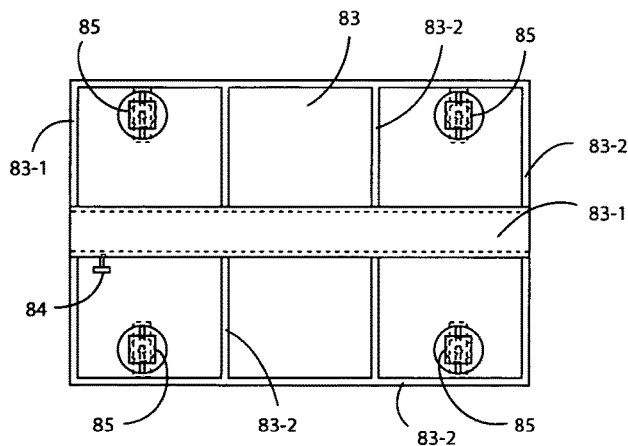
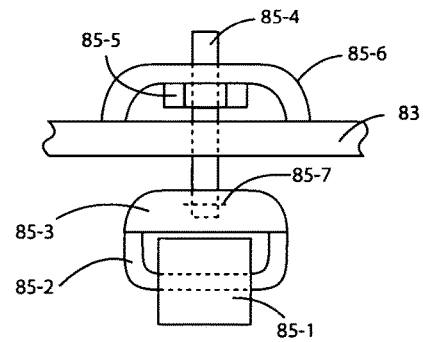
FIG. 62  FIG. 63
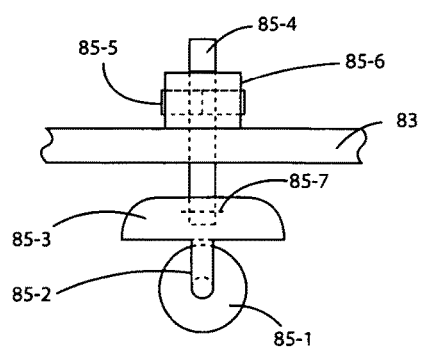
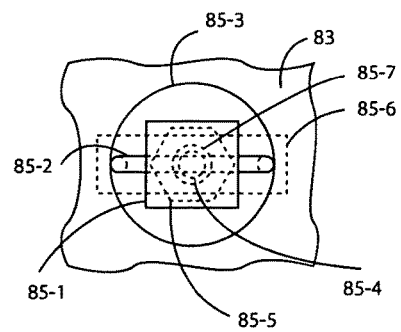
FIG. 64  FIG. 65

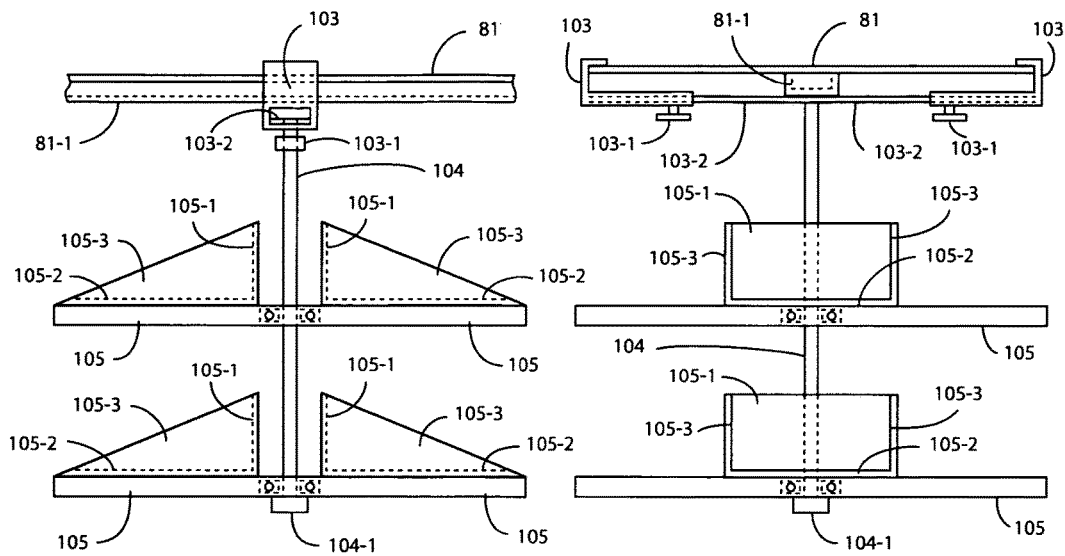
FIG. 103          FIG. 104
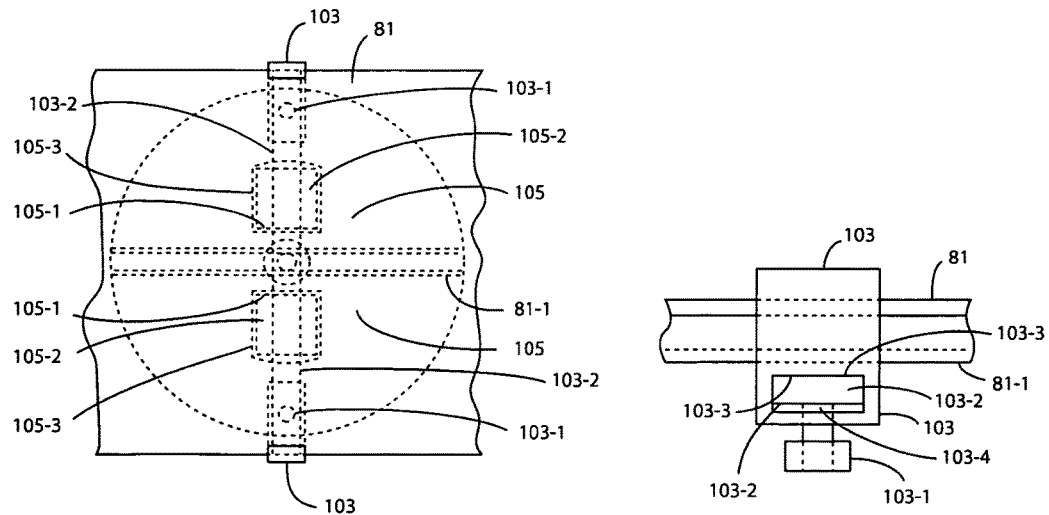
FIG. 105          FIG. 106

METHOD AND APPARATUS OF A VERSATILE HOLDER AND STAND

BACKGROUND OF THE INVENTION

The electronic devices have evolved rapidly recently. With the addition of the flat-panel monitors/TV's, smart phones, and the tablets, the utilization of the digital information has become almost everybody's daily routines. The needs to have the holding accessories to simplify the use of these flat-panels, smart phones, and the tablets have become common and urgent.

As a result, the users have been acquiring one holding stand for each of their flat panel TV, smart phone, and tablet, for either personal applications or for business applications. With so many different types of holding accessories acquired by each user just to fulfill the needs for various devices being used, it becomes not economic and in someway confusing to the users. Furthermore, with users' acquisitions of more electronic devices, the cable management becomes a problem to the users.

Hence, it is the major concern of the present invention to provide the method and apparatus of a versatile portable device holding stand and cable holding devices that can fulfill the needs of the electronic device users to have one holding stand to support or manage their flat panels, smart phones, tablets, and the associated cables.

OBJECTS AND ADVANTAGES OF THE INVENTION

Accordingly, the present invention is used to introduce a method and apparatus of a versatile and universal stand with configurations that can provide the users the tool to simultaneously use multiple devices, including flat panels, smart phones, tablets, energy storage device, energy generator, and cables.

A cable management mechanism is introduced in the present invention allowing the cables associating with the portable devices on the versatile stand or holders to be managed from being tangled together. Adding an energy generator and/or some energy storage devices to the versatile stand further enhances the capabilities and the versatilities of the present invention.

Hence, the advantages and primary object of the present invention are to provide a flexible and versatile stand by incorporating flexible features, particularly to provide an economic, long-lasting and environment-friendly stand to enhance not only the users' enjoyment but also overall expenses by utilizing a stand for multiple devices.

BRIEF DESCRIPTION OF THE DRAWINGS

FIG. 16 illustrates the detail configuration of the front view of the stand supporting mechanism.

FIG. 17 illustrates the detail configuration of the side view of the stand supporting mechanism.

FIG. 18 illustrates the detail configuration of the top view of the stand supporting mechanism.

FIG. 19 illustrates the detail configuration of the side view of the versatile flat-panel stand.

FIG. 20 illustrates the detail configuration of the side view of the versatile flat-panel stand with supporting shelves.

FIG. 21 illustrates the detail configuration of the front view of the versatile flat-panel stand with supporting shelves.

FIG. 22 illustrates the detail configuration of the side view of a supporting shelf.

FIG. 23 illustrates the detail configuration of the front view of a supporting shelf.

FIG. 24 illustrates the detail configuration of the top view of a supporting shelf.

FIG. 25 illustrates the detail configuration of the side view of a rotating shelf.

FIG. 26 illustrates the detail configuration of the top view of a rotating shelf.

FIG. 27 illustrates the detail configuration of the side view of a cable holder.

FIG. 28 illustrates the detail configuration of the front view of a cable holder.

FIG. 29 illustrates the detail configuration of the top view of a cable holder.

FIG. 30 illustrates the detail configuration of the front view of a cable holder to be inserted to a column.

FIG. 60 illustrates the front view of an example of the embodiment of a supporting shelf with low-profile casters.

FIG. 61 illustrates the side view of an example of the embodiment of a supporting shelf with low-profile casters.

FIG. 62 illustrates the bottom view of an example of the embodiment of a supporting shelf with low-profile casters.

FIG. 63 illustrates the front view of an example of the embodiment of a low-profile caster.

FIG. 64 illustrates the side view of an example of the embodiment of a low-profile caster.

FIG. 65 illustrates the bottom view of an example of the embodiment of a low-profile caster.

FIG. 103 illustrates the detail configuration of the side view of the portable shelves.

FIG. 104 illustrates the detail configuration of the front view of the portable shelves.

FIG. 105 illustrates the detail configuration of the top view of the portable shelves.

FIG. 106 illustrates the detail configuration of the side view of the supporting mechanism in the portable shelves.

DETAIL DESCRIPTION OF THE METHOD AND EMBODIMENT

Figure 1:
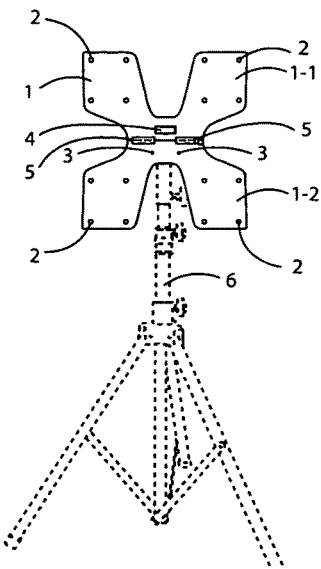
FIG. 1 illustrates the detail configuration of the front view of the versatile flat-panel stand.

As a specifically illustration, an embodiment of the front view of a versatile flat-panel stand is illustrated in FIG. 1 in which numeral 1 illustrates a flat-panel mount or the first means for mounting, numeral 2 illustrates the flat-panel TV mounting holes or the second means for mounting, numerals 3 illustrates a pair of threaded holes or the fifteenth means for securing, numeral 4 illustrates an L-shaped slab to mount onto a sheet metal edge or the fourth means for supporting, numeral 5 illustrates a pair of hinges or the fifth means for flexibility, and numeral 6 illustrates a supporting means which can be any stand base. The flat-panel mount or the first means for mounting, 1, comprises and is split into the sixth means for mounting, 1-1 and the seventh means for mounting 1-2. Numeral 1-1 illustrates the upper half portion of the split flat-panel mount, 1. Numeral 1-2 illustrates the lower half portion of the split flat-panel mount, 1. Numeral 1-1 and numeral 1-2 are joined together by the fifth means for flexibility, 5, in a way that numeral 1-1 and numeral 1-2 are able to be swung around the fifth means for flexibility, 5, such that the sizes of the split flat-panel mount, 1, can be reduced in half for portability.

Figure 2:
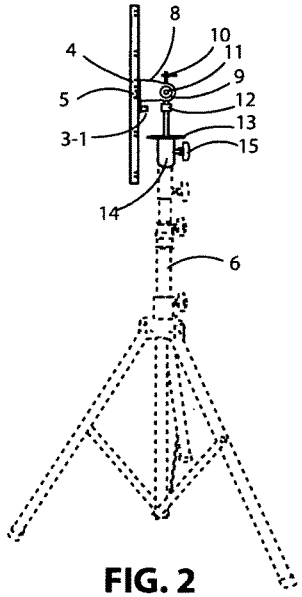
FIG. 2 illustrates the detail configuration of the side view of the versatile flat-panel stand.
Figure 3:
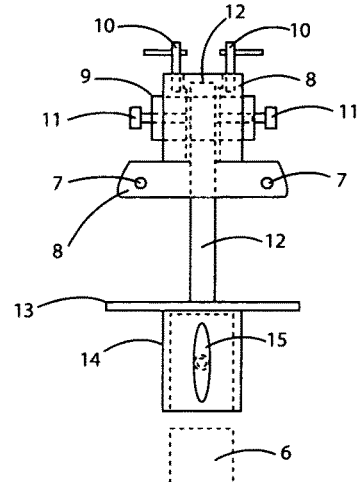
FIG. 3 illustrates the detail configuration of the front view of the versatile flat-panel mount support.
Figure 4:
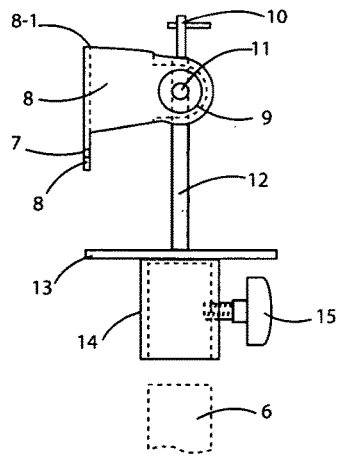
FIG. 4 illustrates the detail configuration of the side view of the versatile flat-panel mount support.
Figure 5:
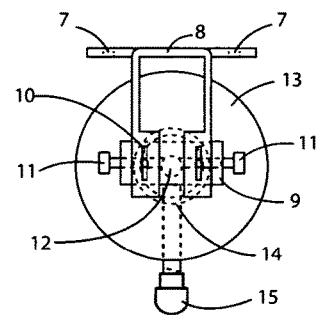
FIG. 5 illustrates the detail configuration of the top view of the versatile flat-panel mount support.

The embodiment of the side view of a versatile flat-panel stand is illustrated in FIG. 2 in which numeral 8 illustrates the eighth means for adjusting which is a mount supporting means that allows the flat-panel mount or the first means for mounting, 1, be mounted onto and secured to it (the mount supporting means). As illustrated in FIG. 1 and FIG. 2, the flat-panel mount, 1, is connected to the supporting means, 6, by means of the means of supporting mechanism or a fourteenth means for supporting which is a complete assembly as shown in FIG. 3, FIG. 4, and FIG. 5. The front view, the side view and the top view of the embodiment of the means of supporting mechanism or the fourteenth means for supporting are illustrated in FIG. 3, FIG. 4, and FIG. 5 in which numeral 7 illustrates the sixteenth means for securing which is preferably configured as a pair of threaded holes matching the hole locations and the thread specifications of the fifteenth means for securing, 3, numeral 8-1 illustrates the eighteenth means for mounting at the top of the surface above the sixteenth means for securing, 7, as a portion of the eighth means for adjusting, 8, numeral 9 illustrates the ninth means for adjusting which is configured to be a cylindrical column with two threaded holes at both flat sides and a hole opening through the diameter of the cylinder at the center between both flat sides, numeral 10 illustrates the tenth means for adjusting which is configured to be a pair of threaded thumb studs for securing the ninth means for adjusting, 9, to the eighth means for adjusting, 8, by tightening the threaded thumb studs against the cylinder surface of the ninth means for adjusting, 9, numeral 11 illustrates the eleventh means for fastening which is configured to be a pair of threaded bolts that are to be threaded through the two threaded holes at both flat sides of the ninth means for adjusting, 9, to the external surface of the supporting column, 12, to secure the ninth means for adjusting, 9, to the supporting column, 12, numeral 13 illustrates the twelfth means for connecting which connects the supporting column, 12, to the thirteenth means for connecting, 14, which is preferably configured to be a hollowed cylinder with an opening at one end and the opening is configured to fit the top of a stand, such as the top of a stand as illustrated by numeral 6. On the peripheral surface of the thirteenth means for connecting, 14, a threaded hole is configured to allow the seventeenth means for fastening, 15, be inserted through to reach the internal surface. Once the top of a stand is inserted into the thirteenth means for connecting, 14, the threaded thumb stud or the seventeenth means for fastening, 15, can be tightened to secure the top of a stand inside thirteenth means for connecting, 14.

An example of the embodiment of the eighth means for adjusting, 8, is preferably made to include five surfaces a shown in FIGS. 3, 4, and 5. A portion of the front surface is preferably made to be flat. Two vertical side surfaces are configured with two circular holes to allow the ninth means for adjusting, 9, be inserted through the holes in the manner as illustrated in FIGS. 3, 4, and 5. Two surfaces are bent 90 degrees inwards from the above vertical side surfaces. Each of these two surfaces bent 90 degrees inwards from the above vertical side surfaces includes one threaded hole which is to be inserted with the tenth means for adjusting, 10, which is to contact the ninth means for adjusting, 9. As the tenth means for adjusting, 10, are tightened through those two threaded holes, the pressure from the tenth means for adjusting, 10, over the surface of the ninth means for adjusting, 9, secures the eighth means for adjusting, 8, to the ninth means, 9, for adjusting and eventually, through the eleventh means for fastening, 11, secures the eighth means for adjusting, 8, to the supporting column, 12.

Figure 6:
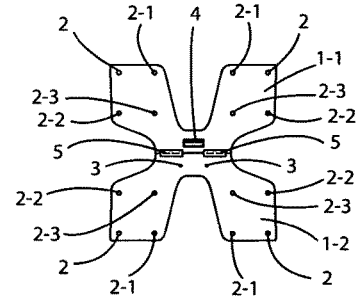
FIG. 6 illustrates the detail configuration of the front view of the versatile flat-panel mount.
Figure 7:
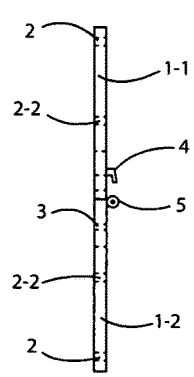
FIG. 7 illustrates the detail configuration of the side view of the versatile flat-panel mount.

An example of the front view and the side view of the flat-panel mount or the first means for mounting is illustrated in FIG. 6 and FIG. 7 in which numeral 1-1 illustrates the sixth means for mounting or the upper half portion of the split flat-panel mount 1, numeral 1-2 illustrates the seventh means for mounting or the lower half portion of the split flat-panel mount 1, numerals 2, 2-1, 2-2, 2-3 illustrate the second means for mounting to mount a flat-panel TV by tightening a set of screws through these second means for mounting to the matching threaded holes on the flat-panel TV. As an example for illustration purpose, numeral 2 illustrate's one of the second means for mounting with the mounting hole dimension of 200 mm×200 mm, numeral 2-1 illustrates one of the second means for mounting to mount a flat-panel TV with the mounting hole dimension of 100 mm×200 mm, numeral 2-2 illustrates one of the second means for mounting to mount a flat-panel TV with the mounting hole dimension of 200 mm×100 mm, numeral 2-3 illustrates one of the second means for mounting to mount a flat-panel TV with the mounting hole dimension of 100 mm×100 mm.

Figure 8:
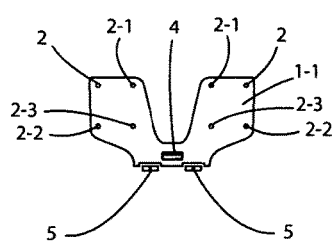
FIG. 8 illustrates the detail configuration of the front view of the folded versatile flat-panel mount.
Figure 9:
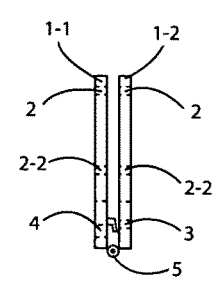
FIG. 9 illustrates the detail configuration of the side view of the folded versatile flat-panel mount.

The flat-panel mount or the first means for mounting, 1, is configured to be collapsible or foldable as illustrated in FIG. 8 and FIG. 9. FIG. 8 illustrates the front view of the collapsed flat-panel mount. FIG. 9 illustrates the detail configuration of the side view of the collapsed flat-panel mount. An example of the embodiment of the fifth means for flexibility, 5, is configured to be two hinges. One flap of these two hinges is secured or welded to the straight side of the sixth means for mounting, 1-1 and the other flap of these two hinges is secured or welded to the straight side of the seventh means for mounting, 1-2, such that one of the sixth means for mounting, 1-1 and the seventh means for mounting, 1-2, can be folded or rotated around the hinges or the fifth means for flexibility, 5, against the other with positions illustrated in FIG. 7 and FIG. 9.

Figure 10:
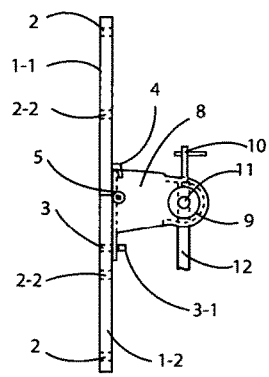
FIG. 10 illustrates the detail configuration of the side view of the versatile flat-panel mount connected and supported by the versatile flat-panel mount support.

FIG. 10 illustrates the detail configuration of the sixth means for mounting, 1-1, and the seventh means for mounting, 1-2, being connected to the eighth means for adjusting, 8, by securing the sixth means for mounting, 1-1, to the eighth means for adjusting, 8, by mounting the fourth means for supporting, 4, onto the eighteenth means for mounting, 8-1, as illustrated in FIG. 4, and securing the seventh means for mounting, 1-2, to the eighth means for adjusting, 8, by fastening the pair of threaded studs or bolts for securing or the third means for securing, 3-1, through the sixteenth means for securing, 7, at the front surface of the eighth means for adjusting, 8, to the fifteenth means for securing, 3, to have the threaded studs or bolts for securing or the third means for securing, 3-1, secured to the pair of threaded holes or the fifteenth means for securing, 3.

Figure 11:
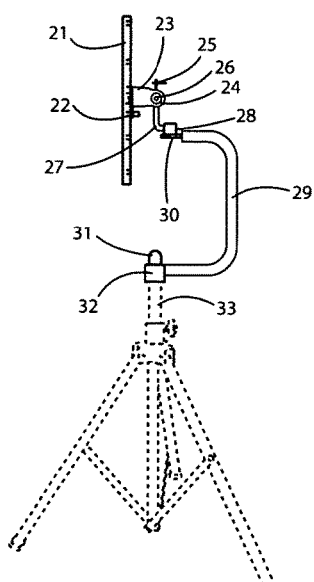
FIG. 11 illustrates the detail configuration of the side view of the versatile flat-panel stand.
Figure 12:
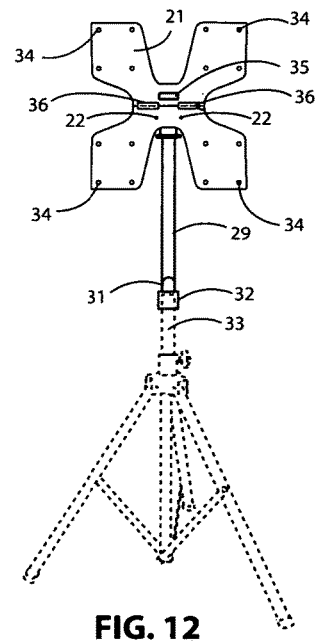
FIG. 12 illustrates the detail configuration of the front view of the versatile flat-panel stand.

The embodiment of the side view and front view of an innovative versatile flat-panel stand are respectively illustrated in FIG. 11 and FIG. 12 in which numeral 21 illustrates a flat-panel mount or the nineteenth means for mounting, numeral 22 illustrates a pair of threaded studs or bolts for securing, numeral 23 illustrates the twentieth means for adjusting, numeral 24 illustrates the twenty-first means for adjusting, numeral 25 illustrates the twenty-second means for adjusting, numeral 26 illustrates the twenty-third means for fastening, numeral 27 illustrates a supporting column which is preferably configured to be formed with a 90 degree angle, numeral 28 illustrates the twenty-fourth means for connecting, numeral 29 illustrates the twenty-fifth means for supporting, numeral 30 illustrates the twenty-sixth means for connecting, numeral 31 illustrates the twenty-seventh means for connecting, numeral 32 illustrates the twenty-eighth means for connecting, and numeral 33 illustrates a stand base or supporting means which is to raise the above stand components to appropriate adjustable height or connect the above stand components to a specific surface as a supporting means, numeral 34 illustrates the flat-panel TV mounting holes or the twenty-ninth means for mounting, numeral 35 illustrates an L-shaped slab to mount onto a sheet metal edge or the thirtieth means for supporting, numeral 36 illustrates a pair of hinges or the thirty-first means for flexibility.

Figure 13:
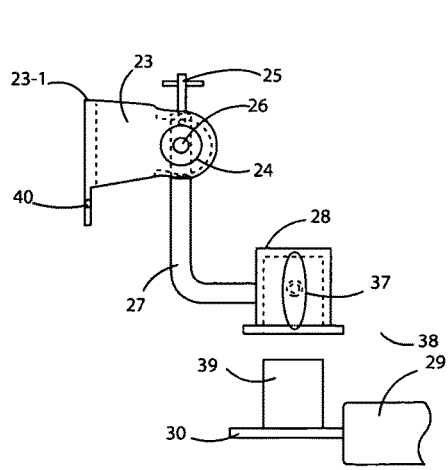
FIG. 13 illustrates the detail configuration of the side view of the versatile flat-panel mount support.
Figure 14:
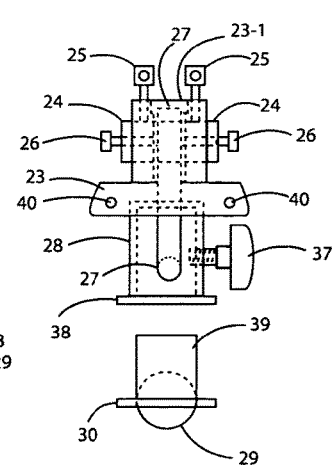
FIG. 14 illustrates the detail configuration of the front view of the versatile flat-panel mount support.
Figure 15:
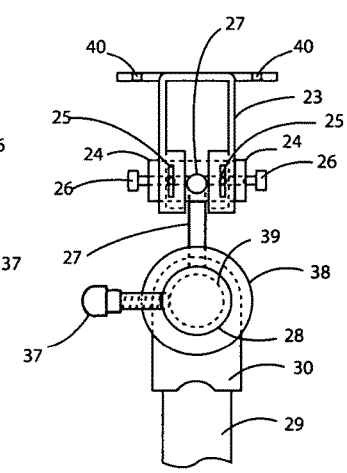
FIG. 15 illustrates the detail configuration of the top view of the versatile flat-panel mount support.

As illustrated in FIG. 13, FIG. 14, and FIG. 15, the twenty-first means for adjusting, 24, is preferably configured to be a cylinder which includes two threaded holes at both flat surfaces of the cylinder. These two threaded holes are to be inserted with the twenty-third means for fastening, 26, which are preferably made of two threaded bolts. The twenty-first means for adjusting, 24, is secured to the supporting column, 27, by fastening those two bolts or the twenty-third means for fastening, 26, through those two threaded holes at both flat surfaces to the external surface of the supporting column, 27. The supporting column, 27, is connected to the twenty-fourth means for connecting, 28. On the peripheral surface of the twenty-fourth means for connecting, 28, a threaded hole is configured to allow the thirty-second means for fastening, 37, be inserted through to reach the internal surface as shown in FIGS. 13, 14 and 15. A supporting means, 38, is connected to the bottom of the twenty-fourth means for connecting, 28. The twenty-fifth means for supporting, 29, is axially connected to the twenty-sixth means for connecting, 30. The thirty-third means for connecting, 39, is configured preferably to be cylindrical on the top of the twenty-sixth means for connecting, 30. The cylinder radius of the thirty-third means for connecting, 39, is configured to match the internal radius of the twenty-fourth means for connecting, 28, such that the thirty-third means for connecting, 39, can be inserted to the hollowed cavity of twenty-fourth means for connecting, 28, and secured in side twenty-fourth means for connecting, 28, by tightening the thirty-second means for fastening, 37. The internal radius of the twenty-fourth means for connecting, 28, is preferably a standard 1⅜ inches in diameter to fit the top of a standard speaker stand or similar devices. Numeral 40 performs the same function as the sixteenth means for securing, 7, in FIG. 3, FIG. 4, and FIG. 5.

An example of the preferred embodiment of the twentieth means for adjusting, 23, is preferably made to include five surfaces a shown in FIG. 13, FIG. 14, and FIG. 15. A portion of the front surface is preferably made to be flat. Two vertical side surfaces are configured with two circular holes to allow the twenty-first means for adjusting, 24, be inserted through the holes in the manner as illustrated in FIG. 13, FIG. 14, and FIG. 15. Two surfaces are bent 90 degrees inwards from the above vertical side surfaces. Each of these two surfaces bent 90 degrees inwards from the above vertical side surfaces includes one threaded hole which is to be inserted with the twenty-second means for adjusting, 25, which is to contact the twenty-first means for adjusting, 24. As the twenty-second means for adjusting, 25, are tightened through those two threaded holes, the pressure from the twenty-second means for adjusting, 25, over the surface of the twenty-first means for adjusting, 24, secures the twentieth means for adjusting, 23, to the twenty-first means for adjusting, 24, and eventually, by tightening the twenty-third means for fastening, 26, secures the twentieth means for adjusting, 23, to the supporting column, 27.

An example of the preferred embodiment of the twenty-fifth means for supporting, 29, the twenty-seventh means for connecting, 31, the twenty-eighth means for connecting, 32, and the supporting means, 33, is illustrated in FIG. 16, FIG. 17, and FIG. 18. As illustrated in the example, the twenty-seventh means for connecting, 31, is configured to be a shrunk portion of the supporting means, 33. The twenty-eighth means for connecting, 32, is configured with an axially hollowed cavity which has dimensions matching exterior surface contour of the twenty-seventh means for connecting, 31, such that the twenty-eighth means for connecting, 32, along with the twenty-fifth means for supporting, 29, is securely connected or mounted on the supporting means, 33, by sitting on and around the twenty-seventh means for connecting, 31. A through hole, 41, is configured on the twenty-seventh means for connecting, 31. This through hole, 41, allows a safety device to ensure that the twenty-fifth means for supporting, 29, is securely connected or mounted on the supporting means, 33. An example of such a safety device is illustrated by numeral 42 and numeral 43. Numeral 42 illustrates a dome-shaped cap having an internal cavity, 44, with dimensions matching the exterior surface contour of the top of the twenty-seventh means for connecting, 31. Numeral 43 illustrates a safety pin. A through hole, 44, is configured on the dome-shaped cap, 42, such that the safety pin, 43, can be inserted through the hole on the dome-shaped cap, 42, and the through hole, 41, on the twenty-seventh means for connecting, 31, to secure the dome-shaped cap, 42, over the top of the twenty-seventh means for connecting, 31.

FIG. 11 illustrates the twenty-fifth means for supporting, 29, as a U-shaped column. Another preferred embodiment of the twenty-fifth means for supporting, 29, could be configured to be a C-shaped column or a semi-circular column as illustrated in FIG. 19. The preferred embodiment of the means for supporting, 29, could also be any appropriate shape as long as it includes a predetermined number of curved column sections between a means for connecting or the twenty-sixth means for connecting, 30, and the second means for connecting or the twenty-eighth means for connecting, 32, such that a number of device holders are allowed to be installed in these available spaces created by the above curved column sections. The space as indicated by the letter A created by the curved column of the twenty-fifth means for supporting, 29, in FIG. 19 will also allow a flat panel TV or any device holder mounted on the top of the thirty-third means for connecting, 39, in FIG. 19 be tilted up and down with greater degree of freedom, such as more downward tilt angle by tilting the flat panel TV or any other device holders, which are mounted close-by, into the created available space A by the curved columns for application flexibilities.

FIG. 20 and FIG. 21 illustrate the side view and front view of a versatile stand with connected to some additional shelves, holders or stands. The preferred embodiment of the means for supporting, 29, could also be any appropriate shape as long as it includes a predetermined number of curved column sections between a means for connecting or the twenty-sixth means for connecting, 30, and the second means for connecting or the thirty-ninth means for connecting, 55, which is connecting the means for supporting, 29, to the stand base, 33. The stand base, 33, provides support and height to the means for supporting, 29. Numeral 50 illustrates the thirty-fourth means for connecting. Numeral 51 illustrates the thirty-fifth means for shelving. Numeral 52 illustrates the thirty-sixth means for connecting. Numeral 53 illustrates a rotatable portable shelf or the rotatable thirty-seventh means for shelving. Numeral 54 illustrates the thirty-eighth means for connecting. Numeral 56 illustrates a portable device holder or the fortieth means for holding. Numeral 56-1 illustrates a flexible gooseneck or the forty-first means for supporting. Numeral 57 illustrates a tablet device or any similar device held by the fortieth means for holding, 56. Numeral 58 illustrates the forty-second means for shelving. Numeral 59 illustrates the forty-third means for supporting. Numeral 60 illustrates the forty-fourth means for connecting. Numeral 61 illustrates a supporting means. Numeral 62 illustrates a cable holder or the forty-fifth means for holding.

FIG. 22, FIG. 23, and FIG. 24 illustrate the side view, the front view, and the top view of the thirty-fifth means for shelving, 51, in which numeral 29 illustrates the twenty-fifth means for supporting, numeral 50 illustrates the thirty-fourth means for connecting, numeral 50-1 illustrates the forty-sixth means for securing, numeral 63 illustrates the forty-seventh means for supporting, numeral 51-1 illustrates the left vertical wall of the thirty-fifth means for shelving, 51, numeral 51-2 illustrates the right vertical wall of the thirty-fifth means for shelving, 51, numeral 51-3 illustrates the rear vertical wall of the thirty-fifth means for shelving, 51, and numeral 51-4 illustrates the supporting shelf surface of the thirty-fifth means for shelving, 51. The supporting shelf surface, 51-4, is supported by the forty-seventh means for supporting, 63. The forty-seventh means for supporting, 63, as illustrated example in FIG. 24, is configured in V-shape with the narrower end connected to the thirty-fourth means for connecting, 50, for an appropriate support. A threaded hole is radially configured on the thirty-fourth means for connecting, 50, such that a thumb bolt or the forty-sixth means for securing, 50-1, can be inserted into the threaded hole and tightened to tightly contact the external surface of the twenty-fifth means for supporting, 29, to secure the thirty-fourth means for connecting, 50, and hence the thirty-fifth means for shelving, 51, to the twenty-fifth means for supporting, 29.

FIG. 25 illustrates the side view of the rotatable thirty-seventh means for shelving, 53, in which numeral 29 illustrates the twenty-fifth means for supporting, numeral 52 illustrates the thirty-sixth means for connecting where the internal surface of the lower portion is configured to be cylindrically wedge-shaped as indicated by numeral 64, numeral 65 illustrates the forty-eighth means for securing which is configured to be a cylindrically wedge-shaped block with the internal surface configured to be sticky and the external surface matching the internal surface of the fourth-ninth means for securing, 64. The sticky internal surface of the forty-eighth means for securing, 65, as the wedge-shaped external surface pressured by the cylindrically wedge-shaped of the internal surface of the lower portion of the forty-ninth means for securing, 64, will be tightly attached to the external surface of the twenty-fifth means for supporting, 29.

FIG. 26 illustrates the top view of the rotatable thirty-seventh means for shelving, 53, in which numeral 66 illustrates a rotating mechanism support or the fiftieth means for rotating which is secured to the thirty-sixth means for connecting, 52, numeral 67 illustrates the bearing structure or the fifty-first means for rotating which are placed in the fiftieth means for rotating, 66. The rotatable thirty-seventh means for shelving, 53, is securely placed over the fifty-first means for rotating, 67, such that the rotatable thirty-seventh means for shelving, 53, can freely rotate over the fifty-first means for rotating, 67, and hence over the fiftieth means for rotating, 66. Since the fiftieth means for rotating, 66, is secured to the thirty-sixth means for connecting, 52, the rotatable thirty-seventh means for shelving, 53, can freely rotate around the thirty-sixth means for connecting, 52.

The side view, the front view, and the top view of the detail embodiment of an example of a cable holder as indicated by numeral 62 in FIG. 20 are illustrated in FIG. 27, FIG. 28, and FIG. 29 respectively. The cable holder, 62, is configured with the fifty-second means for holding, 70, the fifty-third means for holding, 70-1, the fifty-fourth means for holding, 71, the fifty-fifth means for securing, 72, the fifty-seventh means for securing, 74, and the fifty-sixth means for inserting, 73, which is an opening that, as illustrated in FIG. 30, can be extended to open and allows this cable holder, 62, to be inserted into and attached to the twenty-fifth means for supporting, 29. The fifty-fifth means for securing, 72, is preferably configured to be a bolt and the fifty-seventh means for securing, 74, is preferably configured to be a nut. The contour of the opening or the means for attaching to fit the external surface of the cable holder, 62, is illustrated as numeral 75 in FIG. 30. Once the cable holder, 62, is inserted into and attached to the twenty-fifth means for supporting, 29, by contacting the contour of the opening or the means for attaching, 75, the external surface of the twenty-fifth means for supporting, 29, the fifty-fifth means for securing, 72, and the fifty-seventh means for securing, 74, can be inserted through the locations 72-1 and 74-1 respectively to secure the cable holder, 62, to the twenty-fifth means for supporting, 29.

Figure 31:
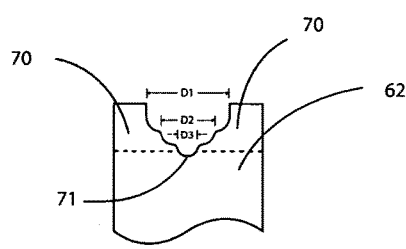
FIG. 31 illustrates the detail configuration of the cable holding slot.

A preferred embodiment of the fifty-fourth means for holding, 71, is illustrated in FIG. 31 in which the cable slot or the fifty-fourth means for holding, 71, is configured to be a downward elongated concave surface. The cross section of the downward elongated concave surface of the fifty-fourth means for holding, 71, includes a multiple of curves with various curvatures and, as an example, divided into three sections with the curve opening widths of D1, D2, and D3. The curvature center of each curve constitutes a line along the direction of the axis of the cylinder-like downward concave surface. All the curvature center lines are preferably in parallel. As illustrated, the width D1 is wider than the width of D2 and the width D2 is wider than the width of D3. The section with the width of D3 can be used to hold any cable with a diameter less than D3. If the diameter of a cable is greater than D3 and less than D2, the cable can be held by the section with the width of D2. If the diameter of a cable is greater than D2 and less than D1, the cable can be held by the section with the width of D1. It is also beneficial to place a plurality of cables in these slots. For example, a user can place three cables with the diameters of D!, D2, and D3 to the fifty-fourth means for holding, 71, or place many cables with various dimensions to the fifty-fourth means for holding, 71.

Figure 32:
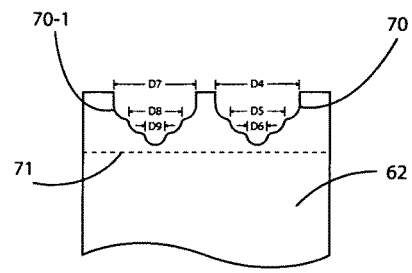
FIG. 32 illustrates the detail configuration of the cable holding slots.

A preferred embodiment of the fifty-second means for holding, 70, and the fifty-third means for holding, 70-1, is illustrated in FIG. 32 in which each of the fifty-second means for holding, 70, and the fifty-third means for holding, 70-1, is configured to be a downward elongated concave surface. The cross section of the downward elongated concave surface of the fifty-second means for holding, 70, includes a number of curves with various curvatures and, as an example, divided into three sections with the curve opening widths of D4, D5, and D6. The cross section of the downward elongated concave surface of the fifty-third means for holding, 70-1, includes a number of curves with various curvatures and, as an example, divided into three sections with the curve opening widths of D7, D8, and D9. The curvature center of each curve constitutes a line along the direction of the axis of the cylinder-like downward concave surface. All the curvature center lines are preferably in parallel. As illustrated, the width of D4 is wider than the width of D5 and the width of D5 is wider than the width of D6. The section with the width of D6 can be used to hold any cable with a diameter less than D6. If the diameter of a cable is greater than D6 and less than D5, the cable can be held by the section with the width of D5. If the diameter of a cable is greater than D5 and less than D4, the cable can be held by the section with the width of D4. Similarly, the width D7 is wider than the width of D8 and the width D8 is wider than the width of D9. The section with the width of D9 can be used to hold any cable with a diameter less than D9. If the diameter of a cable is greater than D9 and less than D8, the cable can be held by the section with the width of D8. If the diameter of a cable is greater than D8 and less than D7, the cable can be held by the section with the width of D7. In the mean time, each of these downward concave surfaces can be used to stack multiple cables. The selection of the widths of D1, D2, D3, D4, D5, D6, D7, D8, and D9 depends upon the cable holder's objective and applications. Also, the number of the downward concaves, as illustrated by 70, 70-1, and 71, varies depending upon the cable holder's objective and applications. Selection of three downward concaves in FIGS. 27 through 32 is for illustration purpose only.

Figure 33:
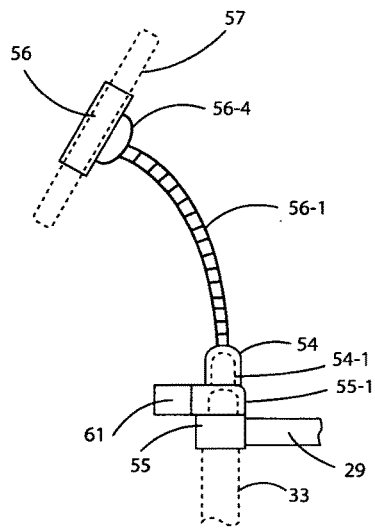
FIG. 33 illustrates the detail configuration of the side view of a tablet holder and stand.
Figure 34:
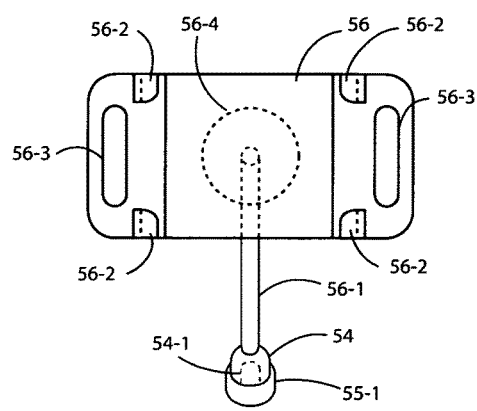
FIG. 34 illustrates the detail configuration of the front view of a tablet holder and stand.

A preferred embodiment of the fortieth means for holding, 56, the thirty-eighth means for connecting, 54, the means for connecting, 55-1, and the forty-first means for supporting, 56-1, is illustrated in FIG. 33 and FIG. 34 in which the thirty-eighth means for connecting, 54, is configured with an internal threads which match the external threads on the fifty-eighth means for connecting, 54-1, the thirty-ninth means' for connecting, 55, is used to connect another shelving device as illustrated later, the means for connecting, 55-1, is used to connect the fifty-eighth means for connecting, 54-1, to the twenty-fifth means for supporting, 29, the forty-first means for supporting, 56-1, which is configured with a flexible material such as a gooseneck and is used to connect the holder base, 56-4, of the fortieth means for holding, 56, to the thirty-eighth means for connecting, 54.

Figure 35:
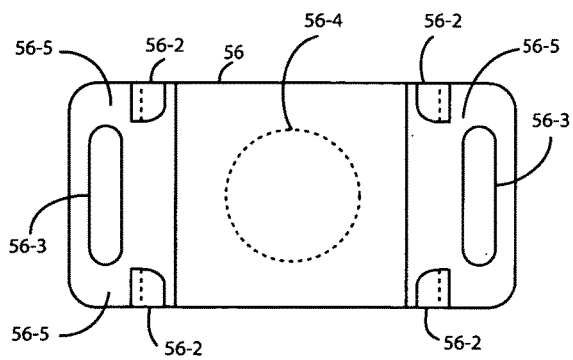
FIG. 35 illustrates the detail configuration of the front view of a tablet holder.
Figure 36:
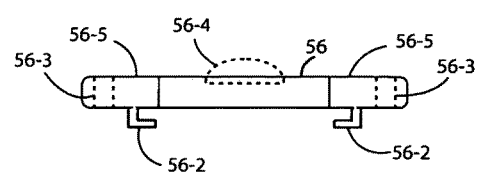
FIG. 36 illustrates the detail configuration of the top view of a tablet holder.
Figure 37:
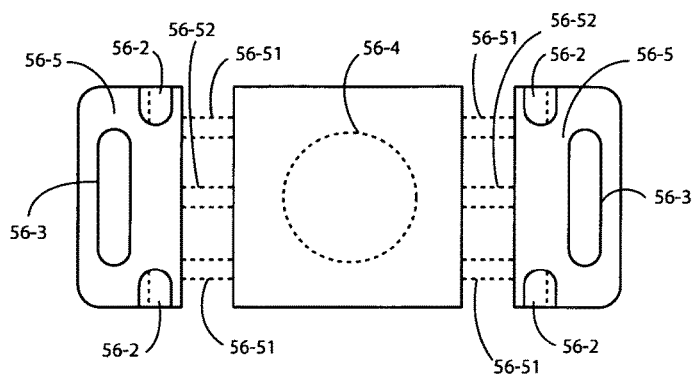
FIG. 37 illustrates the detail configuration of the front view of an expanded tablet holder.
Figure 38:
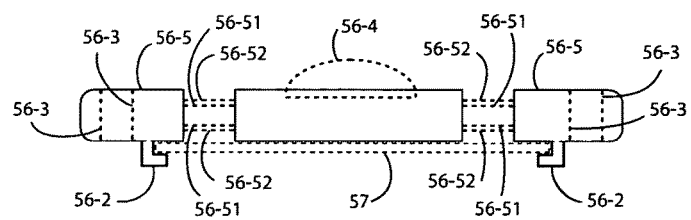
FIG. 38 illustrates the detail configuration of the top view of an expanded tablet holder.

An example of the detail embodiment of the fortieth means for holding or simply a device holder, 56, is illustrated in FIG. 35, FIG. 36, FIG. 37 and FIG. 38. FIG. 35 and FIG. 36 illustrate the front view and the top view of the device holder, 56. As illustrated, the device holder, 56, which is connected to the holder base, 56-4, includes two fifty-ninth means for holding or simply expandable holding means, 56-5, one at the left side and the other at the right side. Each, 56-5, includes two sixtieth means for holding or L-shaped universal device-holding means, 56-2, and one hollowed universal handling means or sixty-first means for holding, 56-3. The universal device-holding means, 56-2, are configured on the expandable holding means, 56-5, to form a chamber with predetermined dimensions to fit the edges of targeted portable devices. Also, the universal device-holding means, 56-2, are preferably formed at the top edge and the bottom edge of the expandable holding means, 56-5, for achieving the most holding stability and effectiveness on a tablet or a similar device. Both hollowed universal handling means or sixty-first means for holding, 56-3, are preferably formed to be vertically elongated for a user's hands to hold them and to pull the expandable holding means, 56-5, away from each other laterally by the forces applied by the user's hands, as illustrated in FIG. 37 and FIG. 38.

As illustrated in FIG. 37 and FIG. 38, both expandable holding means, 56-5, are away from each other along the guidance means, 56-52, laterally with the spring-loaded force, generated by the spring means, 56-51, which is configured to pull both expandable holding means, 56-5, back to their original position, as illustrated in FIG. 35 and FIG. 36, when the opening pulling force upon both hollowed universal handling means, 56-3, is released. Once the pulling force by the person's hands is released, both expandable holding means, 56-5, due to the above spring-loaded force by the spring means, 56-51, will be pulled back to their original position as illustrated in FIG. 35 and FIG. 36.

The other examples of the detail embodiment of the device holders, 56, are illustrated in FIGS. 39, 40, 41, 42, 43, 44, 45, 46, 47, and 48.

Figure 39:
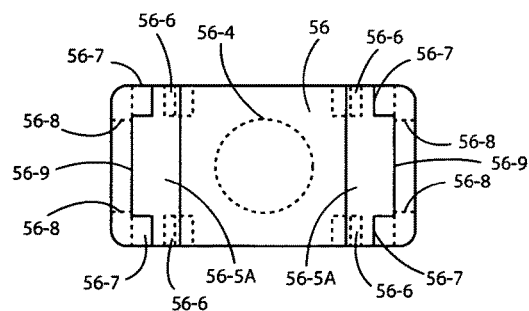
FIG. 39 illustrates the detail configuration of the front view of an expandable, ergonomic and versatile tablet holder.
Figure 40:
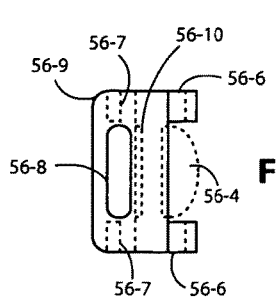
FIG. 40 illustrates the detail configuration of the side view of an expandable, ergonomic and versatile tablet holder.
Figure 41:
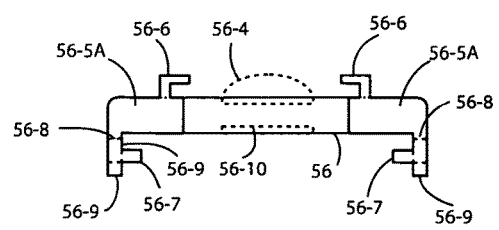
FIG. 41 illustrates the detail configuration of the top view of an expandable, ergonomic and versatile tablet holder.

FIG. 39, FIG. 40, and FIG. 41 illustrate the front view, side view, and top view of another preferred device holder, 56. As illustrated, the device holder, 56, which is connected to the holder base, 56-4, includes two expandable holding means, 56-5A, and each expandable holding means, 56-5A, includes two L-shaped universal device-holding means or the sixty-second means for holding, 56-6, one extended flap or the sixty-fifth means for supporting, 56-9, which is bent from the expandable holding means, 56-5A, with a right angle, and a hollowed universal handling means or the sixty-fourth means for holding, 56-8, and a half-flange universal device-holding means or the sixty-third means for holding, 56-7, are formed on the extended flap or the sixty-fifth means for supporting, 56-9. The L-shaped universal device-holding means or the sixty-second means for holding, 56-6, and the half-flange universal device-holding means or the sixty-third means for holding, 56-7, are configured at the opposite sides of the expandable holding means, 56-5A. Each of the universal device-holding means, 56-6 & 56-7, is configured on the expandable holding means, 56-5A, to form a chamber with predetermined dimensions to fit the edges of targeted portable devices. Two circular concave cavities or sixty-sixth means for connecting, 56-10, are configured at the location of the holder base or sixty-seventh means for supporting, 56-4, one on each side. These two circular concave cavities or sixty-sixth means for connecting, 56-10, enable the device holder, 56, to be utilized in two different orientations such that the L-shaped universal device-holding means or the sixty-second means for holding, 56-6, or the half-flange universal device-holding means or the sixty-third means for holding, 56-7, can be used to hold different sizes of a tablet or similar device. The L-shaped universal device-holding means or the sixty-second means for holding, 56-6, or the half-flange universal device-holding means or the sixty-third means for holding, 56-7, are preferably formed at the top edge and the bottom edge of the expandable holding means, 56-5A, for achieving the most holding stability and effectiveness on a tablet or a similar device. Both hollowed universal handling means, 56-8, are preferably formed to be vertically elongated for a person's hands to hold them and to pull the expandable holding means, 56-5A, away from each other laterally, as illustrated in FIG. 42 and FIG. 43.

Figure 42:
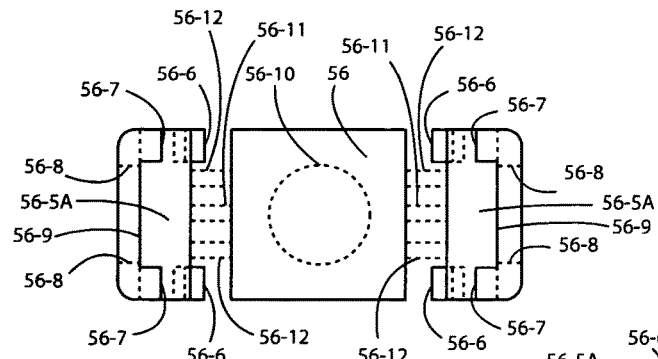
FIG. 42 illustrates the detail configuration of the front view of an expanded expandable, ergonomic and versatile tablet holder.
Figure 43:
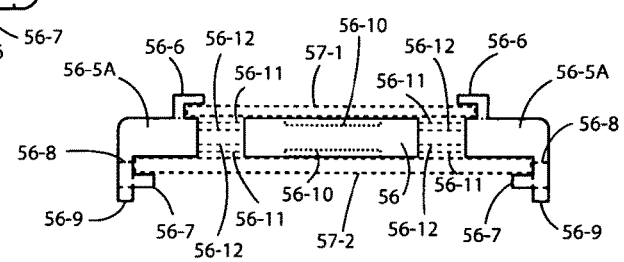
FIG. 43 illustrates the detail configuration of the top view of an expanded expandable, ergonomic and versatile tablet holder.

As illustrated in FIG. 42 and FIG. 43, both expandable holding means, 56-5A, are away from each other along the guidance means, 56-11, laterally with the spring-loaded force, generated by the spring means, 56-12, trying to pull them back to their original position as illustrated in FIGS. 39, 40 and 41. Once the pulling force by the user's hands is released, both expandable holding means, 56-5A, due to the above spring-loaded force by the spring means, 56-12, will be pulled back to their original position as illustrated in FIGS. 39, 40, and 41. In FIG. 43, Numeral 57-1 illustrates a smaller tablet device being held by the L-shaped universal device-holding means, 56-6, and numeral 57-2 illustrates a larger tablet device being held by the half-flange universal device-holding means, 56-7. Since the universal device-holding means, 56-6 & 56-7, are placed laterally at different distances from the center or the edge of the device holder, 56, this configuration makes the device holder, 56, be able to hold substantially wider range of the portable device sizes than with just one L-shaped universal device-holding means alone such as those illustrated in FIGS. 35 through 38.

Figure 44:
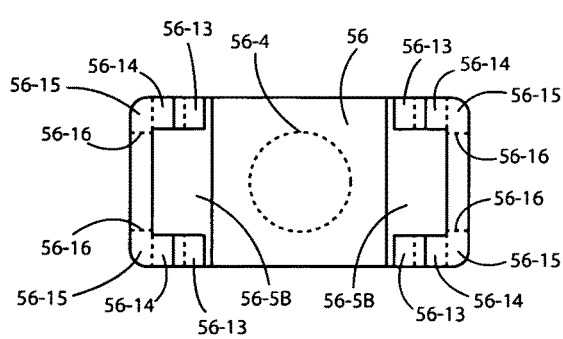
FIG. 44 illustrates the detail configuration of the front view of an expandable, ergonomic and versatile tablet holder.
Figure 45:
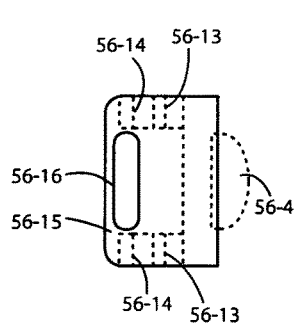
FIG. 45 illustrates the detail configuration of the side view of an expandable, ergonomic and versatile tablet holder.
Figure 46:
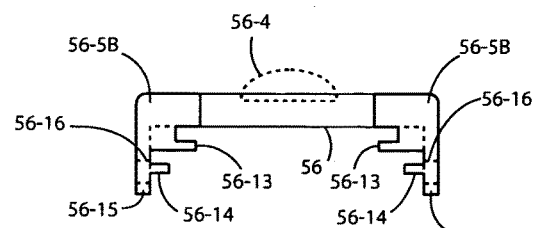
FIG. 46 illustrates the detail configuration of the top view of an expandable, ergonomic and versatile tablet holder.

FIG. 44, FIG. 45, and FIG. 46 illustrate the front view, side view, and top view of another preferred device holder, 56. As illustrated, the device holder, 56, which is connected to the holder base, 56-4, includes two expandable holding means, 56-5B, and each expandable holding means, 56-5B, includes two L-shaped universal device-holding means, 56-13, one extended flap, 56-15, which is bent from the expandable holding means, 56-5B, with a right angle, and a hollowed universal handling means, 56-16, and anther two L-shaped universal device-holding means, 56-14, which are configured on the extended flap, 56-15. Each of the universal device-holding means, 56-13 & 56-14, are configured on the expandable holding means, 56-5B, to form a chamber with predetermined dimensions to fit the edges of targeted portable devices. The L-shaped universal device-holding means, 56-13, and the L-shaped universal device-holding means, 56-14, are preferably formed vertically at the top edge and the bottom edge of the expandable holding means, 56-5B, for achieving the most holding stability and effectiveness on a tablet or a similar device. Both hollowed universal handling means, 56-16, are preferably formed to be vertically elongated for a person's fingers to hold them and to pull the expandable holding means, 56-5B, away from each other laterally, as illustrated in FIG. 47 and FIG. 48.

Figure 47:
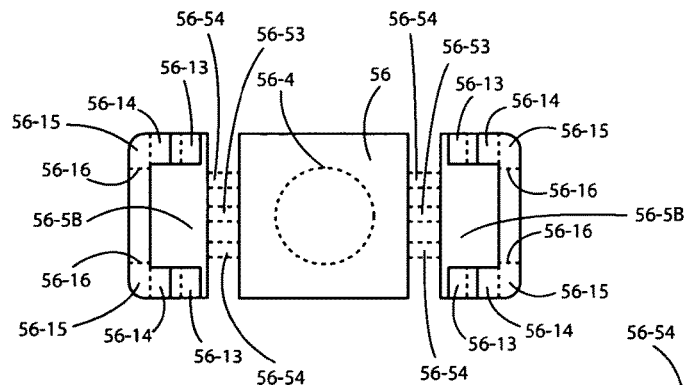
FIG. 47 illustrates the detail configuration of the front view of an expanded expandable, ergonomic and versatile tablet holder.
Figure 48:
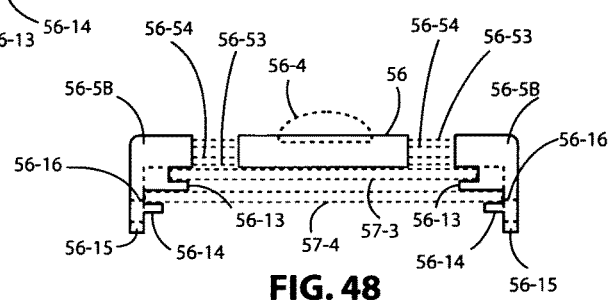
FIG. 48 illustrates the detail configuration of the top view of an expanded expandable, ergonomic and versatile tablet holder.

As illustrated in FIG. 47 and FIG. 48, both expandable holding means, 56-5B, are pulled away from each other along the guidance means, 56-53, laterally with the spring-loaded force generated by the spring means, 56-54, trying to pull them back to their original position as illustrated in FIG. 44, FIG. 45, and FIG. 46. Once the pulling force by the user's pulling fingers is released, both expandable holding means, 56-5B, due to the above spring-loaded force by the spring means, 56-54, will be pulled back to their original position as illustrated in FIG. 44, FIG. 45, and FIG. 46. In FIG. 48, Numeral 57-3 illustrates a smaller portable or tablet device being held by the L-shaped universal device-holding means, 56-13, and numeral 57-4 illustrates a larger portable or tablet device being held by the L-shaped universal device-holding means, 56-14. Since the L-shaped universal device-holding means, 56-13 & 56-14, are placed laterally at different distances from the center or edge of the device holder, 56, this configuration makes the device holder, 56, be able to hold substantially wider range of the portable device sizes than with just one L-shaped universal device-holding means alone such as those illustrated in FIGS. 35 through 38.

Figure 49:
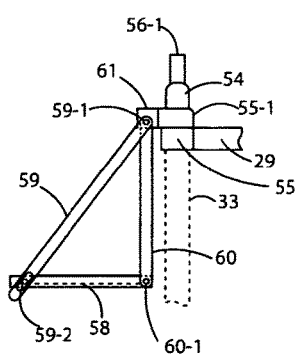
FIG. 49 illustrates the detail configuration of the side view of a supporting shelf.
Figure 50:
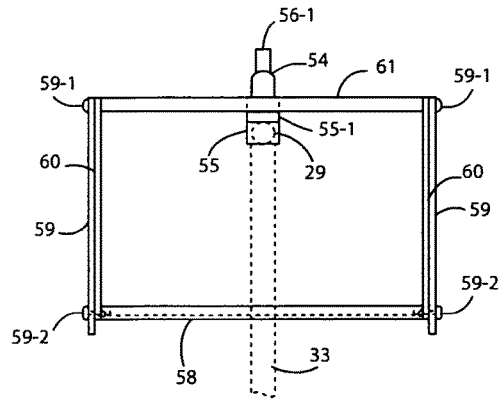
FIG. 50 illustrates the detail configuration of the front view of a supporting shelf.

A preferred embodiment of the forty-second means for shelving, 58, the thirty-ninth means for connecting, 55, the forty-third means for connecting, 59, and the forty-fourth means for connecting, 60, is illustrated in FIG. 49 and FIG. 50 in which the thirty-ninth means for connecting, 55, and the connecting means, 61, connect the forty-second means for shelving, 58, the forty-third means for connecting, 59, and the forty-fourth means for connecting, 60, to the stand, 33, as illustrated in FIG. 20 and FIG. 21. The forty-second means for shelving, 58, is secured by securing the threaded bolts 59-1, 59-2 and 60-1.

Figure 51:
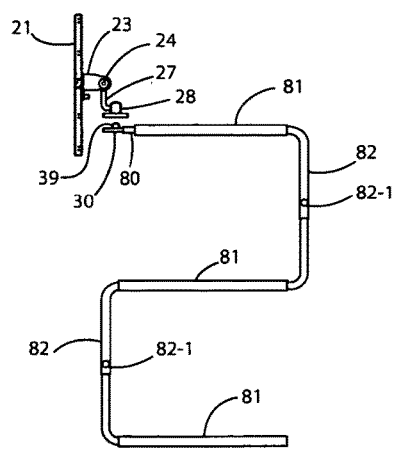
FIG. 51 illustrates an example of a preferred embodiment of the side view of a versatile flat-panel stand.
Figure 53:
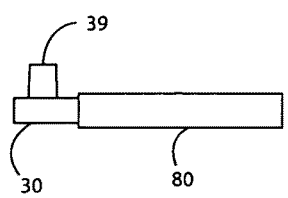
FIG. 53 illustrates an example of the side view of a flat-panel mount supporting and connecting column.
Figure 54:
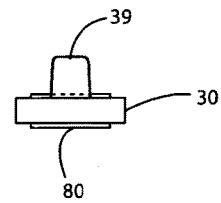
FIG. 54 illustrates an example of the front view of a flat-panel mount supporting and connecting column.

Another example of a preferred embodiment of the side view of a versatile flat-panel stand is illustrated in FIG. 51 in which numeral 21 illustrates a flat-panel mount as illustrated in FIG. 11, numeral 23 illustrates the twentieth means for adjusting as illustrated in FIG. 11, numeral 24 illustrates the twenty-first means for adjusting as illustrated in FIG. 11, numeral 27 illustrates a supporting column as illustrated in FIG. 11, numeral 28 illustrates the twenty-fourth means for connecting as illustrated in FIG. 11, numeral 30 illustrates the twenty-sixth means for connecting as illustrated in FIG. 11, numeral 39 illustrates the thirty-third means for connecting as illustrated in FIG. 13, numeral 80 illustrates the sixty-eighth means for connecting, numeral 81 illustrates a universal shelving means or the sixth-ninth means for shelving, numeral 82 illustrates a universal supporting means or the seventieth means for supporting, numeral 82-1 illustrates the seventy-first means for securing for adjusting the length of the seventieth means for supporting, 82. The side view and the front view of the sixty-eighth means for connecting, 80, is illustrated in FIG. 53 and FIG. 54 respectively. As illustrated in FIG. 53 and FIG. 54, the sixty-eighth means for connecting, 80, is preferably configured to be an elongated rectangular column and preferably with cross-sectional dimensions the same as the cross-sectional dimensions of the seventieth means for supporting, 82.

Figure 52:
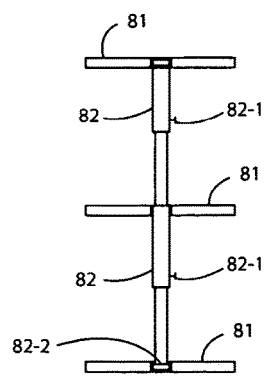
FIG. 52 illustrates an example of a preferred embodiment of the front view of a versatile stand.
Figure 55:
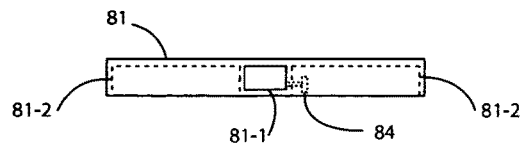
FIG. 55 illustrates the front view of an example of the embodiment of a supporting shelf.
Figure 56:
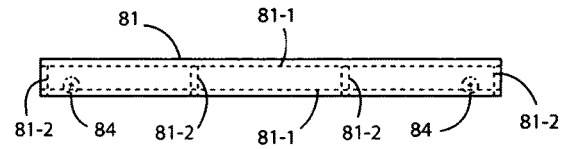
FIG. 56 illustrates the side view of an example of the embodiment of a supporting shelf.
Figure 57:
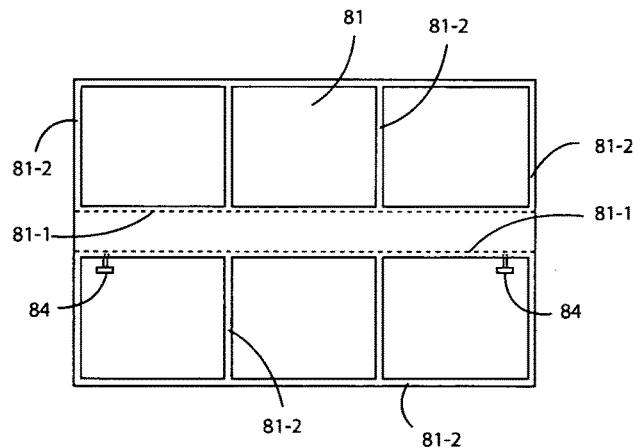
FIG. 57 illustrates the bottom view of an example of the embodiment of a supporting shelf.
Figure 58:
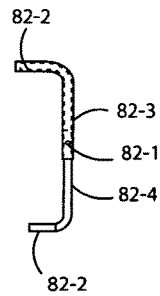
FIG. 58 illustrates the side view of an example of the embodiment of a supporting column.
Figure 59:
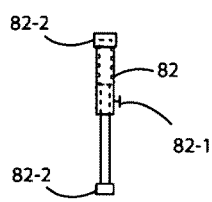
FIG. 59 illustrates the front view of an example of the embodiment of a supporting column.

FIG. 52 illustrates the preferred embodiment of the front view of the versatile flat-panel stand as illustrated in FIG. 51. The detail embodiment of the universal shelving means or the sixty-ninth means for shelving, 81, is illustrated in FIG. 55, FIG. 56, and FIG. 57. The detail embodiment of the universal supporting means or the seventieth means for supporting, 82, is illustrated in FIG. 58 and FIG. 59. As can be seen, the universal shelving means, 81, is configured to have substantially larger sizes in two dimensions, namely the depth and the width, than the third dimension, namely the thickness, while the universal supporting means, 82, is configured to have substantially larger sizes in one dimension, namely the length, than the other two dimensions, namely the width and the thickness. The universal shelving means, 81, is configured to have substantially larger width and depth for providing large shelving space and is configured to have much smaller thickness, providing various shelving applications and saving the material, cost, and space when in storage. In the mean time, the configuration of the universal shelving means, 81, enables the universal shelving means, 81, be able to be dismantled from the universal supporting means, 82, and be stackable on top of each other so that the required storage space for the stand can be minimized when the stand is not in use. The universal supporting means, 82, is configured to have substantially larger dimension in length for providing a large vertical space between two universal shelving means, 81, joined by two ends of the universal supporting means, 82. The universal supporting means, 82, is configured to have substantially smaller width and thickness for the connection to the universal shelving means, 81 (with similar thickness). Since two universal shelving means, 81, are joined by two ends of the universal supporting means, 82, the universal shelving means, 81, and the universal supporting means, 82, are placed in alternate sequence geometrically. Numeral 82-2 is illustrated in FIG. 58 and FIG. 59.

FIG. 55, FIG. 56, and FIG. 57 illustrate the front view, the side view, and the bottom view of an example of the embodiment of the sixty-ninth means for shelving, 81. As illustrated, the sixty-ninth means for shelving, 81, is configured as a reinforced flat plate with a hollowed column, a universal connecting means, or the seventy-fifth means for connecting, 81-1, and the seventy-sixth means for supporting, 81-2, which are the semi-flanges, extrusions, or the edges that are perpendicular to the top surface of the sixty-ninth means for shelving, 81, to reinforce the vertical strength of the sixty-ninth means for shelving, 81. Numeral 84 illustrates a universal securing means or the seventy-third means for securing which can be a safety pin, a thumb stud, any tightening device, or any securing mechanism.

FIG. 58 and FIG. 59 illustrate the side view and the front view of an example of the embodiment of the seventieth means for supporting, 82. As illustrated, the seventieth means for supporting, 82, is configured as an elongated hollowed column with two sections, 82-3 and 82-4, to have the length of the seventieth means for supporting, 82, adjustable and variable. As illustrated, the section 82-4 has smaller dimensions and its external dimensions match the internal dimensions of the section 82-3 such that the section 82-4 can be inserted into the section 82-3 to have the length of the seventieth means for supporting, 82, adjusted. Once the seventieth means for supporting, 82, is adjusted to the desired length, this length can be fixed by tightening the seventy-first means for securing, 82-1, to secure the section 82-4 to the section 82-3 at that position. The end portion of both 82-3 and 82-4 are bent about 90 degrees to form the seventy-seventh means for connecting as illustrated by numeral 82-2. There are two seventy-seventh means for connecting, 82-2, one as the extension of the section 82-3 and the other as the extension of the section 82-4. Both seventy-seventh means for connecting, 82-2, are formed to have the same dimensions and are in a similar orientation, in the same orientation, or in parallel for being aligned simultaneously to two hollowed columns, 81-1, on two universal shelving means or sixty-ninth means for shelving, 81. The cross section of the seventy-seventh means for connecting, 82-2, matches the internal cross section of the hollowed column, 81-1, so that both sections, 82-3 and 82-4, of the seventieth means for supporting, 82, can be connected to the sixty-ninth means for shelving, 81, by inserting the seventy-seventh means for connecting, 82-2, into the hollowed column, 81-1. The sixty-ninth means for shelving, 81, is secured to the seventieth means for supporting, 82, by tightening the universal securing means or the seventy-third means for securing, 84.

Figure 78:
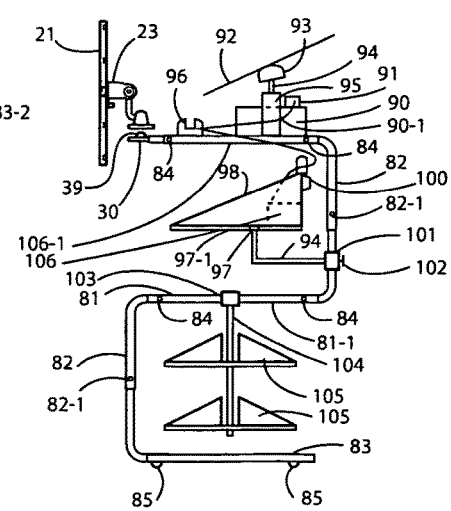
FIG. 78 illustrates the detail configuration of the side view of the versatile flat-panel stand with the solar-cell panel, rechargeable batteries, and the supporting shelves.

The bottom shelf of the embodiment as illustrated in FIG. 51 and FIG. 52 can include casters for mobility as illustrated by numeral 83 in FIG. 78. FIG. 60, FIG. 61, and FIG. 62 illustrate the front view, the side view, and the bottom view of an example of the embodiment of the bottom shelf with casters for mobility. As illustrated, the bottom shelf with casters for mobility or the seventy-second means for shelving, 83, is configured as a reinforced flat plate with a hollowed column, 83-1, and perpendicular supporting flaps or edges or the seventy-ninth means for supporting, 83-2, which are the semi-flanges, extrusions, or the edges that are perpendicular to the top surface of the seventy-second means for shelving, 83, to reinforce the vertical strength of the seventy-second means for shelving, 83. The seventy-third means for securing, 84, is configured as a thumb stud. Numeral 85 illustrates the seventy-fourth means for moving which is preferably low-profile casters or can be any type of wheels, casters, or any sliding or moving devices.

The front view, side view, and bottom view of the low profile caster or the seventy-fourth means for moving, 85, are illustrated in FIG. 63, FIG. 64, and FIG. 65 respectively. As illustrated, numeral 85-1 is a caster, numeral 85-2 is the caster shaft, numeral 85-3 is the extension of the caster shaft configured to be a rotation ring which secures the caster shaft, 85-2, to the threaded caster height adjustment shaft, 85-4, while allows the caster shaft, 85-2, to rotate or to swivel horizontally. The threaded caster height adjustment shaft, 85-4, has one end connected to the caster shaft extension or the rotation ring, 85-3, through a compressible ring stop (similar to a piston ring), 85-7, fitting in an enlarged slot in the threaded caster height adjustment shaft, 85-4, and the other end connected to the caster position adjustment means, 85-6. The caster shaft, 85-2, the extension of the caster shaft, 85-3, the caster height adjustment shaft, 85-4, and the compressible ring stop, 85-7, are collectively designated as the caster supporting means. Numeral 85-5 is the caster position adjustMent means, preferably configured as a threaded caster height adjustment nut with cylindrically inner threads, installed on the caster height adjustment shaft, 85-4, by rotating the threaded caster height adjustment nut, 85-5, over the threads of the threaded caster height adjustment shaft, 85-4, and is placed underneath the caster position adjustment means, 85-6. Since the caster position adjustment means, 85-6, is secured to the the seventy-second means for shelving, 83, the caster, 85-1, will be raised or lowered by turning the threaded caster height adjustment nut, 85-5, depending upon the rotation direction of the caster position adjustment means or the threaded caster height adjustment nut, 85-5. If the caster height adjustment shaft, 85-4, is longer than the vertical height of the perpendicular supporting flaps or edges or the seventy-ninth means for supporting, 83-2, the caster, 85-1, can be raised by turning the caster position adjustment means, 85-5, to the height that the caster, 85-1, is no longer contacting the floor or ground and the perpendicular supporting flaps or edges or the seventy-ninth means for supporting, 83-2, will support the entire weight of the stand. When the perpendicular supporting flaps or edges or the seventy-ninth means for supporting, 83-2, support the entire weight of the stand, the caster, 85-1, is considered hidden from the sight or from the function and the stand with the above casters, 85-1, is secured to the floor. Hence, the relative position of the caster, 85-1, to the stand is adjusted by moving the caster, 85-1, up or down relatively to the caster position adjustment means, 85-6, by rotating the caster position adjustment means, 85-5.

Figure 66:
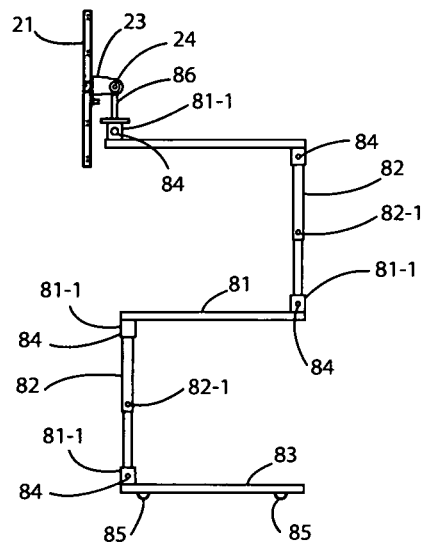
FIG. 66 illustrates another example of a preferred embodiment of the side view of a versatile flat-panel stand.

An alternative embodiment of the side view of a versatile flat-panel stand as illustrated in FIG. 51 is illustrated in FIG. 66 in which numeral 21 illustrates a flat-panel mount as illustrated in FIG. 11, numeral 23 illustrates the twentieth means for adjusting as illustrated in FIG. 11, numeral 24 illustrates the twenty-first means for adjusting as illustrated in FIG. 11, the supporting column, 27, as illustrated in FIG. 11 is replaced and illustrated by numeral 86, numeral 81 illustrates the sixty-ninth means for shelving, numeral 81-1 illustrates the seventy-fifth means for connecting, numeral 82 illustrates the seventieth means for supporting, numeral 82-1 illustrates the seventy-first means for securing for adjusting the length of the seventieth means for supporting, 82, numeral 83 illustrates the seventy-second means for shelving, numeral 84 illustrates the seventy-third means for securing which can be a safety pin, a thumb stud, any tightening device, or any securing mechanism, numeral 85 illustrates the seventy-fourth means for moving which can be any type of wheels, casters, or any sliding or moving device.

Figure 67:
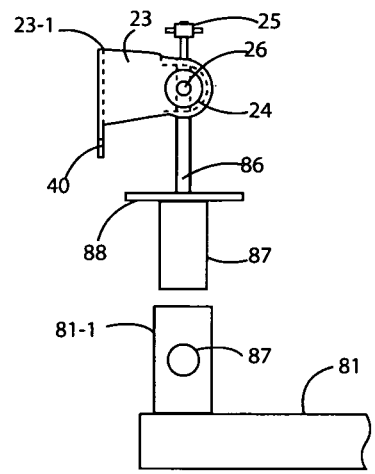
FIG. 67 illustrates the detail configuration of the side view of the versatile flat-panel mount support.
Figure 68:
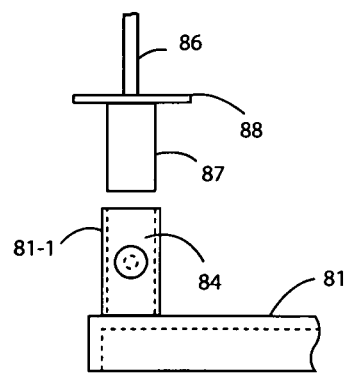
FIG. 68 illustrates the detail configuration of the side view of the connection between the mount support and the supporting shelf.
Figure 69:
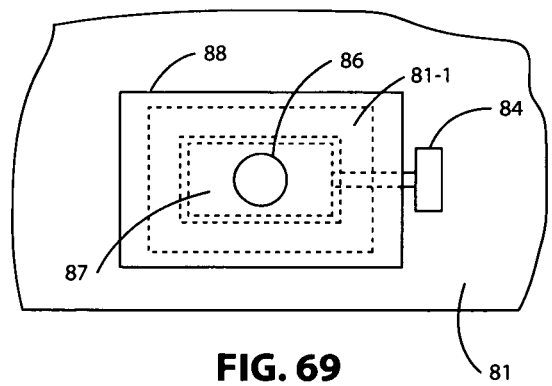
FIG. 69 illustrates the detail configuration of the top view of the connection between the mount support and the supporting shelf.

Numerals 23 through 26 are illustrated in FIGS. 13, 14, 15 and 67. The side view and top view of the detail embodiment of numerals 81, 81-1, 84, 86, 87, and 88 as illustrated in FIG. 67 are illustrated in FIG. 68 and FIG. 69 in which numeral 81 illustrates the sixty-ninth means for shelving, numeral 81-1 illustrates the seventy-fifth means for connecting, numeral 84 illustrates the seventy-third means for securing, which is illustrated as a thumb stud as an example, numeral 86 illustrates a supporting column which is, like numeral 27, connected to the twentieth means for adjusting, 23, through numerals 24, 25 and 26 as illustrated in FIGS. 13, 14, and 15, numeral 87 illustrates the seventy-eighth means for connecting, which is connected to the bottom of a supporting means, 88. The external cross-section dimensions of the seventy-eighth means for connecting, 87, is configured to match the internal cross-section dimensions of the seventy-fifth means for connecting, 81-1, so that the seventy-eighth means for connecting, 87, can be inserted into the hollowed seventy-fifth means for connecting, 81-1, and secured by tightening the seventy-third means for securing, 84.

Figure 70:
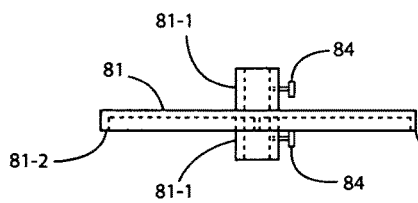
FIG. 70 illustrates the front view of an example of the embodiment of a supporting shelf.
Figure 71:
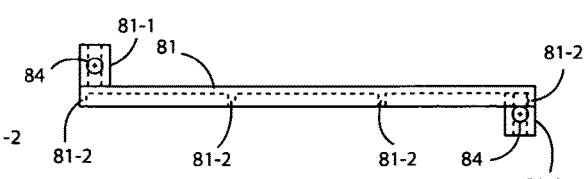
FIG. 71 illustrates the side view of an example of the embodiment of a supporting shelf.
Figure 72:
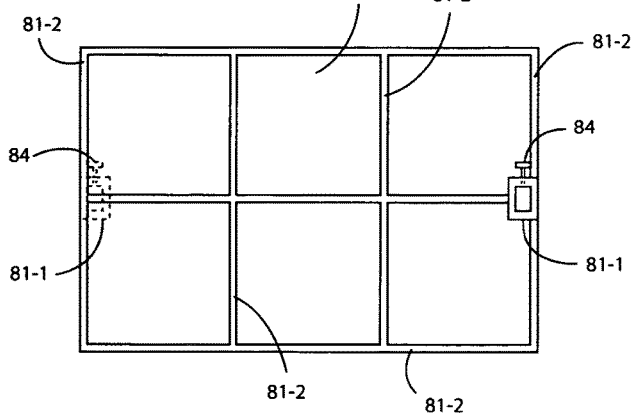
FIG. 72 illustrates the bottom view of an example of the embodiment of a supporting shelf.

FIG. 70, FIG. 71, and FIG. 72 illustrate the front view, the side view, and the bottom view of an example of the embodiment of the sixty-ninth means for shelving, 81. As illustrated, the sixty-ninth means for shelving, 81, is configured as a reinforced flat plate with the seventy-sixth means for supporting, 81-2, which are semi-flanges, extrusions; or the edges that are perpendicular to the top surface of the sixty-ninth means for shelving, 81, to reinforce the vertical strength of the sixty-ninth means for shelving, 81. The seventy-fifth means for connecting, 81-1, is configured to be a hollowed column sitting at the central location of the shorter edge of the sixty-ninth means for shelving, 81. There are two seventy-fifth means for connecting, 81-1, one sitting at one shorter edge facing upwards preferably perpendicular to the top surface of the sixty-ninth means for shelving, 81, and the other sitting at the other shorter edge facing downwards preferably perpendicular to the top surface of the sixty-ninth means for shelving, 81. The seventy-third means for securing, 84, is configured as a thumb stud installed at one side of the seventy-fifth means for connecting, 81-1.

Figure 73:
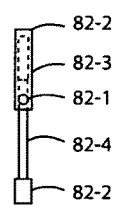
FIG. 73 illustrates the side view of an example of the embodiment of a supporting column.
Figure 74:
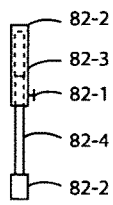
FIG. 74 illustrates the front view of an example of the embodiment of a supporting column.

FIG. 73 and FIG. 74 illustrate the side view and the front view of an example of the embodiment of the seventieth means for supporting, 82. As illustrated, the seventieth means for supporting, 82, is configured as an elongated hollowed column with two sections, 82-3 and 82-4, to have the length of the seventieth means for supporting, 82, adjustable. As illustrated, the section 82-4 has smaller dimensions and its external dimensions match the internal dimensions of the larger section 82-3 such that the section 82-4 can be inserted into the section 82-3 to have the length of the seventieth means for supporting, 82, adjusted. Once the seventieth means for supporting, 82, is adjusted to the desired length, this length can be fixed by tightening the seventy-first means for securing, 82-1, to secure the section 82-4 to the section 82-3 at that position. The end portion of both 82-3 and 82-4 are the seventy-seventh means for connecting as illustrated by numeral 82-2. There are two seventy-seventh means for connecting, 82-2, one as the extension of the section 82-3 and the other as the extension of the section 82-4. Both seventy-seventh means for connecting, 82-2, are formed to have the same dimensions. The cross section of the seventy-seventh means for connecting, 82-2, matches the internal cross section of the hollowed column, 81-1, so that both sections, 82-3 and 82-4, of the seventieth means for supporting, 82, can be connected to the sixty-ninth means for shelving, 81, by inserting the seventy-seventh means for connecting, 82-2, into the hollowed column, 81-1. The sixty-ninth means for shelving, 81, is secured to the seventieth means for supporting, 82, by tightening the seventy-third means for securing, 84.

Figure 75:
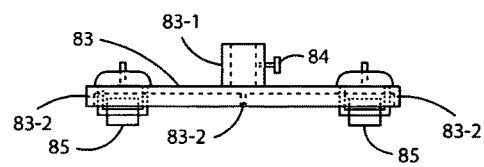
FIG. 75 illustrates the front view of an example of the embodiment of a supporting shelf with low-profile casters.
Figure 76:
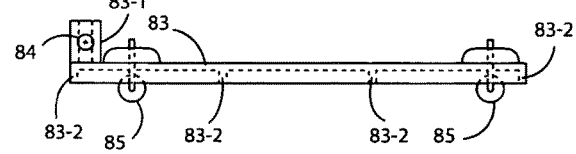
FIG. 76 illustrates the side view of an example of the embodiment of a supporting shelf with low-profile casters.
Figure 77:
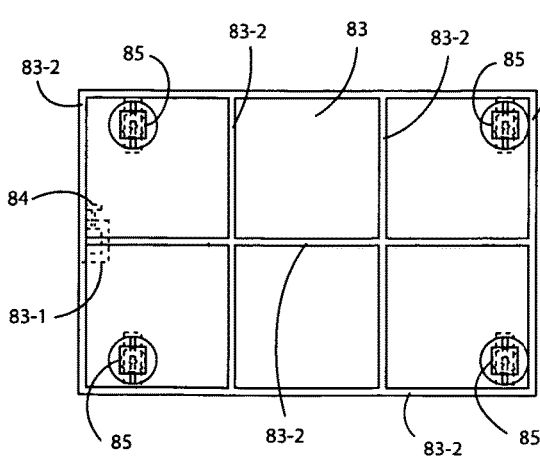
FIG. 77 illustrates the bottom view of an example of the embodiment of a supporting shelf with low-profile casters.

FIG. 75, FIG. 76, and FIG. 77 illustrate the front view, the side view, and the bottom view of an example of the embodiment of the seventy-second means for shelving, 83. As illustrated, the seventy-second means for shelving, 83, is configured as a reinforced flat plate with the perpendicular supporting flaps or edges or the seventy-ninth means for supporting, 83-2, which are semi-flanges, extrusions, or the edges that are perpendicular to the top surface of the seventy-second means for shelving, 83, to reinforce the vertical strength of the seventy-second means for shelving, 83. The seventy-third means for securing, 84, is configured as a thumb stud. The seventy-fourth means for moving, 85, are configured as low-profile casters. The lower profile casters or the seventy-fourth means for moving, 85, are illustrated in FIG. 63, FIG. 64, and FIG. 65.

An example of an improvement of the versatile flat-panel stand as illustrated in FIG. 51 is illustrated in FIG. 78 in which numeral 81 illustrates the sixty-ninth means for shelving or simply means for shelving, numeral 81-1 illustrates the hollowed column, numeral 82 illustrates the seventieth means for supporting or simply means for supporting, numeral 83 illustrates the seventy-second means for shelving, numeral 84 illustrates the seventy-third means for securing which can be a safety pin, a thumb stud, any tightening device, or any securing mechanism, numeral 85 illustrates the seventy-fourth means for moving which can be any type of wheels, casters, or any sliding or moving device, numeral 90 is the eightieth means for storing energy or simply means for storing energy, numeral 91 is the eighty-first means for managing energy or simply means for managing energy for the means for storing energy, 90, numeral 92 is the means for generating energy or the eighty-second means for converting, numeral 90-1 is the electrical cable delivering the electrical energy from or to the means for storing energy, 90, numeral 93 is the eighty-third means for orienting for adjusting the orientation of the means for generating energy, 92, numeral 94 is the eighty-fourth means for supporting, numeral 95 is the eighty-fifth means for holding, numeral 96 is a cable holding device designated the eighty-sixth means for holding, numeral 97 is the eighty-seventh means for supporting, numeral 97-1 is the eighty-eighth means for supporting, numeral 99-1 is the ninety-first means for connecting, numeral 98 is the eighty-ninth means for storing, numeral 99 is the ninetieth means for supporting, numeral 100 is the ninety-second means for holding, numeral 101 is the ninety-third for connecting, numeral 102 is the ninety-fourth means for securing, numeral 103 is the ninety-fifth means for connecting, numeral 104 is the ninety-sixth means for hanging, and numeral 105 is the ninety-seventh means for shelving, numeral 106 is the ninety-eighth means for storing energy, numeral 106-1 is the electrical cable delivering the electrical energy from the ninety-eighth means for storing energy, 106. As can be seen, the versatile flat-panel stand as illustrated in FIG. 78 is configured with multiple numbers of the means for storing energy on more than one means for shelving.

Figure 79:
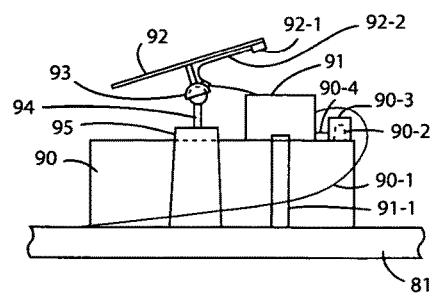
FIG. 79 illustrates the detail configuration of the side view of the solar-cell panel, rechargeable batteries, and the supporting shelves of a stand.
Figure 80:
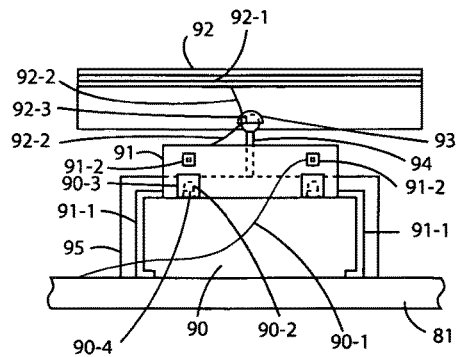
FIG. 80 illustrates the detail configuration of the front view of the solar-cell panel, rechargeable batteries, and the supporting shelves of a stand.
Figure 81:
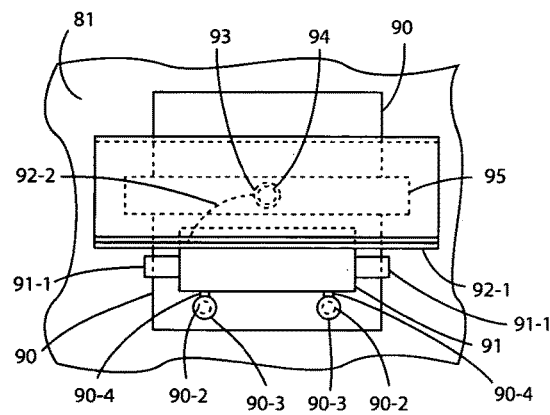
FIG. 81 illustrates the detail configuration of the top view of the solar-cell panel, rechargeable batteries, and the supporting shelves of a stand.

The preferred embodiment of the eightieth means for storing energy or simply the means for storing energy, 90, the eighty-first means for managing energy or simply the means for managing energy, 91, and the means for generating energy, 92, is illustrated in FIG. 79, FIG. 80, and FIG. 81 in which the means for storing energy, 90, preferably one or more rechargeable batteries, are secured to the sixty-ninth means for shelving, 81, by means of the eighty-fifth means for holding, 95, the means for managing energy, 91, which is located at an optimal location to be able to conveniently accessed to control and manage the electrical energy delivering to or sending from the means for storing energy, 90, is secured to the sixty-ninth means for shelving, 81, by means of the ninety-ninth means for holding, 91-1, and is connected to the eightieth means for storing energy, 90, by means of an electrical current transmitting device or the one-hundredth means for transmitting, 90-4, which is connected to the battery electric poles, 90-2, which are covered under the insulation devices, 90-3. An example of the means for generating energy, 92, which is illustrated as a solar-cell power panel energy including a one-hundred first means for outputting or an electrical output, 92-1, delivering the electrical energy generated by the solar-cell power panel or the means for generating energy, 92, to the means for storing energy, 90, through an electrical current transmitting cable or the one-hundred second means for transmitting, 92-2. Electrical outlets or the one-hundred third means for providing power, 91-2, are included on the means for managing energy or the electrical control and management device, 91, as electrical outlets providing the electrical power to any electrical devices on the stand or in the close-by area.

The means for storing energy, 90, the means for managing energy, 91, and/or the means for generating energy, 92, as illustrated in FIG. 78, FIG. 79, FIG. 80, and FIG. 81 can also be installed in exactly the same way on the shelves as illustrated in FIGS. 20 through 25, such as the thirty-fifth means for shelving, 51, the rotatable thirty-seventh means for shelving, 53, and the forty-second means for shelving, 58.

Figure 82:
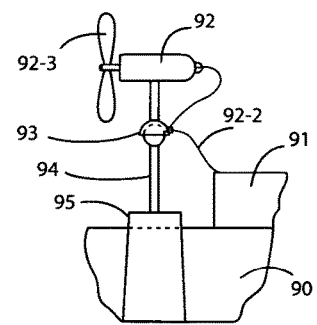
FIG. 82 illustrates the detail configuration of the side view of the wind electricity generators and a portion of rechargeable batteries.
Figure 83:
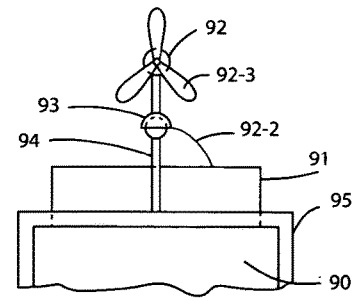
FIG. 83 illustrates the detail configuration of the front view of the wind electricity generators and a portion of rechargeable batteries.

The side view and the front view of another example of the means for generating energy or the eighty-second means for converting energy, 92, is illustrated in FIG. 82 and FIG. 83 in which, instead of utilizing the solar-cell power panel as the external energy source, a wind power electricity generation device is utilized as the means for generating energy, 92, in which numeral 92-3 illustrates the wind propellers to drive the wind power electricity generation device, 92, to generate the electrical power as an external energy source to the means for storing energy, 90.

Figure 84:
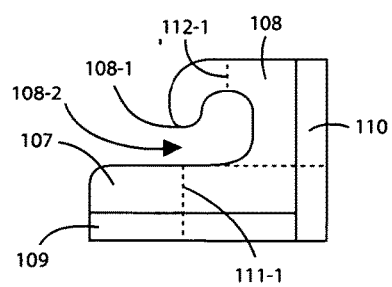
FIG. 84 illustrates the detail configuration of the side view of a cable holder.
Figure 85:
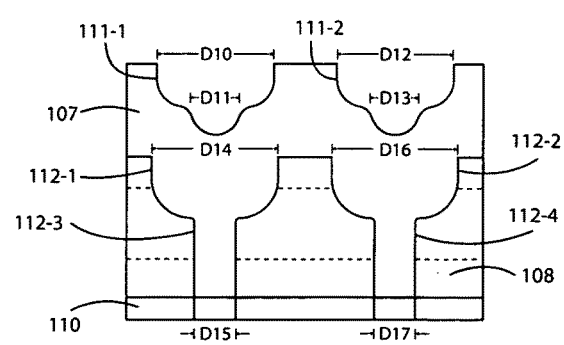
FIG. 85 illustrates the detail configuration of the front view of a cable holder.
Figure 86:
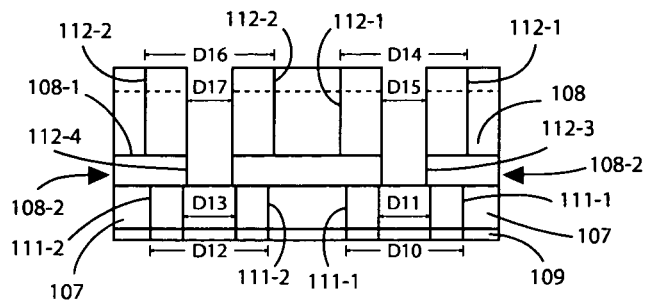
FIG. 86 illustrates the detail configuration of the top view of a cable holder.
Figure 87:
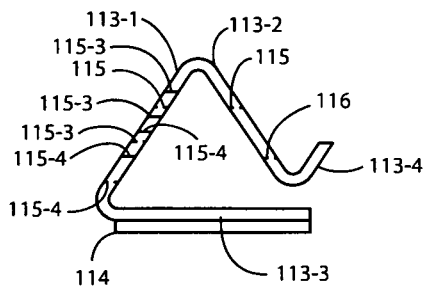
FIG. 87 illustrates the detail configuration of the side view of a tablet and cable holder.
Figure 88:
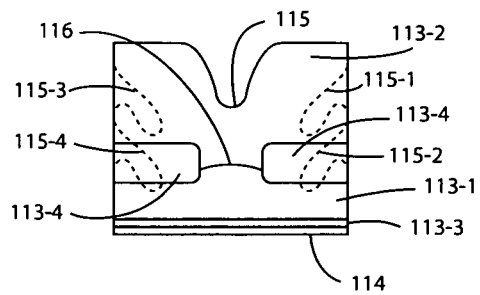
FIG. 88 illustrates the detail configuration of the front view of a tablet and cable holder.
Figure 89:
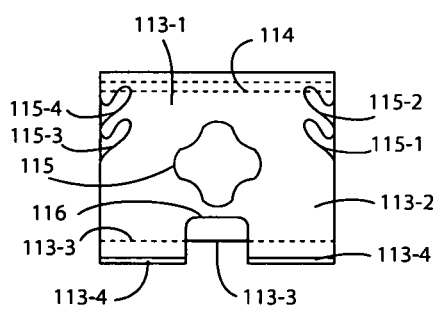
FIG. 89 illustrates the detail configuration of the top view of a tablet and cable holder.
Figure 90:
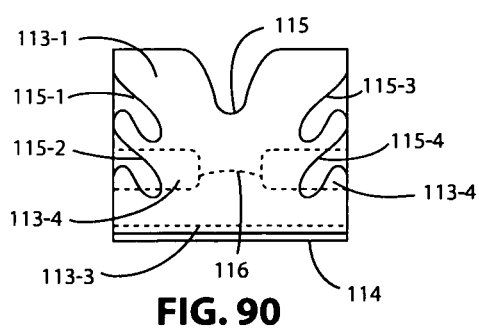
FIG. 90 illustrates the detail configuration of the rear view of a tablet and cable holder.
Figure 91:
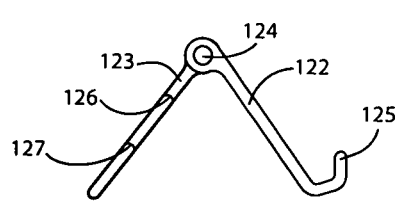
FIG. 91 illustrates the detail configuration of the side view of a foldable tablet and cable holder.
Figure 92:
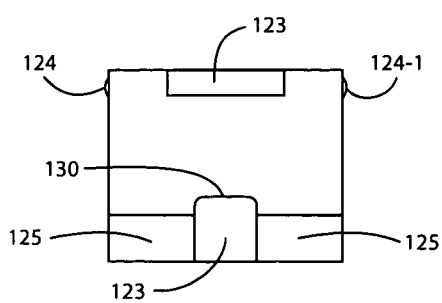
FIG. 92 illustrates the detail configuration of the front view of a foldable tablet and cable holder.
Figure 93:
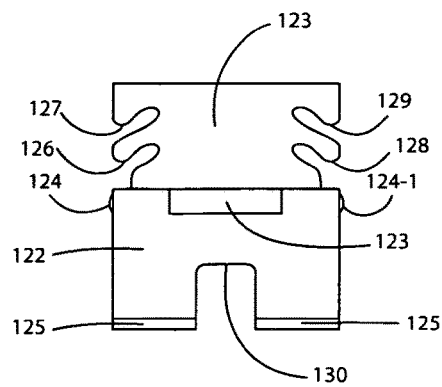
FIG. 93 illustrates the detail configuration of the top view of a foldable tablet and cable holder.
Figure 94:
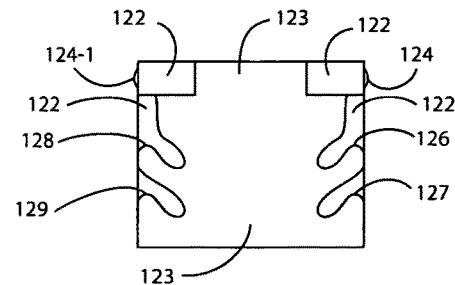
FIG. 94 illustrates the detail configuration of the rear view of a foldable tablet and cable holder.

The side view, front view, and top view of a preferred embodiment of the eighty-sixth means for holding, 96, as illustrated in FIG. 78 is illustrated in FIG. 84, FIG. 85, and FIG. 86 in which numeral 107 illustrates the first supporting body or the one-hundred fourth means for supporting, numeral 109 illustrates a contacting means or the one-hundred fifth means for contacting which is attached to the first supporting body, 107, numeral 108 illustrates the second supporting body or the one-hundred sixth means for supporting which, as a continuous part of the first supporting body, 107, is extended up with approximately a right angle from one side of the first supporting body, 107, and then further extended in the direction parallel and in adjacent to the first supporting body, 107, to form the one-hundred ninth means for holding or a hollowed column with a parallel opening, 108-2, between the first supporting body, 107, and the second supporting body, 108, numeral 110 illustrates another contacting means or the one-hundred seventh means for contacting which is attached to the second supporting body, 108, and, is oriented to be extended in a direction different from the first contacting means, 109, numerals 111-1 and 111-2 illustrate the downward elongated concave surfaces as cable slots where each of the cross section of the downward elongated concave surface includes a multiple of curves with various curvatures and, as an example, divided into two sections with the curve opening widths of D10, D11 and D12, D13 respectively, numerals 112-1 and 112-2 illustrate the cable holding slots or the downward elongated concave surfaces where the cross section of the cable holding slots or the downward elongated concave surface includes a curve with opening widths of D14 and D16 respectively, numerals 112-3 and 112-4 illustrate the cable slots which are configured to be straight emptied channels from the cable holding slots of 112-1 and 112-2 all the way through to the bottom of the contacting body, 110, respectively. The widths of these cable slots, 112-3 and 112-4, are D15 and D17 respectively. Either one or both of the first contacting means, 109, and the second contacting means, 110, could be configured in the eighty-sixth means for holding, 96.

The contacting means, 109, can be configured to be made of either a magnetic material to enable the eighty-sixth means for holding, 96, be capable of attaching to a metal body or made of a material such as rubber or other resistant or rubbery material such that the eighty-sixth means for holding, 96, while sitting on a surface, will not slide over the surface or made of a material containing glue or similar material such that the eighty-sixth means for holding, 96, while sitting on a predetermined surface, will be secured to the predetermined surface. Similarly, the contacting means, 110, is configured to be made of either a magnetic material to enable the eighty-sixth means for holding, 96, be capable of attaching to a metal body or made of a material such as rubber or other resistant or rubbery material such that the eighty-sixth means for holding, 96, while sitting on a predetermined surface, will not slide over the surface or made of a material containing glue or similar material such that the eighty-sixth means for holding, 96, while sitting on a predetermined surface, will be secured to the predetermined surface. The contacting means, 109 & 110, can be configured to be made of different material to achieve some specific application needs.

In FIG. 84, numeral 108-1 illustrates the one-hundred eighth means for holding or an extension of the second supporting body, 108, and such an extension extends out to make the one-hundred ninth means for holding or a hollowed column with a parallel opening, 108-2, between the one-hundred fourth means for supporting, 107, and the one-hundred sixth means for supporting, 108, smaller so that, when some cables are placed in the opening, 108-2, the cables will be confined inside the opening, 108-2, and extra force is needed to remove the cables once they are in the opening, 108-2. This feature is for the application of routing and securing cables through certain space and paths.

As illustrated in FIG. 85, the width D10 is wider than the width D11. The section with the width D11 can be used to hold any cable with a diameter less than D11. If the diameter of a cable is greater than D11 and less than D10, the cable can be held by the section with the width of D10. Similarly, the width D12 is wider than the width D13. The section with the width D13 can be used to hold any cable with a diameter less than D13. If the diameter of a cable is greater than D13 and less than D12, the cable can be held by the section with the width of D12. The cable holding slots, 111-1 and 111-2, are configured to hold more than one cables. For example, the cable holding slot 111-1 can be used to hold at least two cables, one with the diameter of D10 and the other with the diameter of D11 while the cable holding slot 111-2 can be used to hold at least two cables, one with the diameter of D12 and the other with the diameter of D13.

As illustrated in FIG. 86, the cable slots 112-3 and 112-4 has the opening from the front all way to the front surface of the one-hundred fourth means for supporting, 107. These two cable slots, 112-3 and 112-4, can also be used to hang cables with cable connectors sitting on the top of the opening, 108-2, and cables being hung from the cable connectors and down through the opening of the cable slots, 112-3 and 112-4. The side view, the front view, the top view, and the rear view of another example of the eighty-sixth means for holding, 96, are illustrated in FIG. 87, FIG. 88, FIG. 89, and FIG. 90, respectively, as a means for supporting in which numeral 113-1 illustrates the rear surface of the means for supporting or the rear supporting means, numeral 113-2 illustrates the front surface of the means for supporting or the front supporting means, numeral 113-3 illustrates the base surface of the means for supporting or the base supporting means, numeral 113-4 illustrates a holding means for holding portable devices or as an extension of the front supporting means, 113-2, numeral.114 illustrates the one-hundred tenth means for contacting which is configured to be made of either a magnetic material to enable the eighty-sixth means for holding, 96, as a means for supporting be capable of attaching to a metal body or made of a material such as rubber or other resistant or rubbery material such that the eighty-sixth means for holding, 96, as a means for supporting, while sitting on a surface, will not slide over the surface or made of a material containing glue or similar material such that the eighty-sixth means for holding, 96, as a means for supporting, while sitting on a predetermined surface, will be secured to the predetermined surface, numeral 115 illustrates the concave cavities as cable holding slots or the one-hundred eleventh means for holding at the ridge between the rear surface, 113-1, and the front surface, 113-2, numeral 115-1 illustrates the concave cavity as an upper cable holding slot or the one-hundred twelfth means for holding at the right side of the rear surface, 113-1, numeral 115-2 illustrates the concave cavity as the lower cable holding slot or one-hundred thirteenth means for holding at the right side of the rear surface, 113-1, numeral 115-3 illustrates the concave cavity as the upper cable holding slot or the one-hundred fourteenth means for holding at the left side of the rear surface, 113-1, numeral 115-4 illustrates the concave cavity as the lower cable holding slot or the one-hundred fifteenth means for holding at the left side of the rear surface, 113-1, numeral 116 illustrates a slot or one-hundred sixteenth means for holding configured at the center of the two slabs of the holding means for holding portable devices, 113-4, or as an extension of the front surface, 113-2. The number of the cable holding slots is just for illustration purpose only. The number of the cable holding slots can be any number defined by the available surface space and the application needs. The dimensions of the concave cavities are preferably capable of holding a plurality of cables and preferably between the sizes of cables and the sizes of cable connectors such that, when the portable device is not present at the holding means for holding portable devices, 113-4, any cables can be held at these cable holding slots by placing the cable connector at the other side of the cable holding slot from the body of the cable. In the meantime, when the portable devices are present at the holding means for holding portable devices, 113-4, the cables associated with these portable devices can be properly placed or managed along these cable holding slots to ensure that these cables won't get damaged or tangled.

Figure 95:
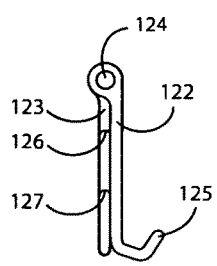
FIG. 95 illustrates the detail configuration of the side view of a folded foldable tablet and cable holder.

The side view, the front view, the top view, and the rear view of another example of the eighty-sixth means for holding, 96, are illustrated in FIG. 91, FIG. 92, FIG. 93, and FIG. 94 as the means for supporting in which numeral 122 illustrates the front surface of the means for supporting or the front supporting means, numeral 123 illustrates the rear surface of the means for supporting or the rear supporting means. As can been seen, the rear supporting means, 123, is configured to be able to be folded on the rear side of the front supporting means, 122, by pressing down the side controlling mechanism, 124 or 124-1, as illustrated in FIG. 95. A means for holding portable devices, 125, is configured at the lower side or bottom of the front supporting means, 122, and can either be an extended and bent portion of the front supporting means, 122, or be added or installed onto the front supporting means, 122. The means for holding portable devices, 125, can also be configured at the other appropriate portions of the front supporting means, 122, and/or the rear supporting means, 123. Preferably, the width of the means for holding portable devices, 125, is the same as or narrower than the width of the front supporting means, 122. Numerals 126, 127, 128, and 129, illustrate some portions of the rear supporting means, 123, emptied to form concave cavities. Numeral 126 illustrates the concave cavity as an upper cable holding slot at the left side of the rear supporting means, 123, numeral 127 illustrates the concave cavity as the lower cable holding slot at the left side of the rear supporting means, 123, numeral 128 illustrates the concave cavity as the upper cable holding slot at the right side of the rear supporting means, 123, and numeral 129 illustrates the concave cavity as the lower cable holding slot at the right side of the rear supporting means, 123. Numeral 130 illustrates a slot or an opening configured at the center of the two slabs of the means for holding portable devices, 125, and this slot or opening, 130, can be utilized as a way to run or hold cables. The number of the cable holding slots is just for illustration purpose only. The number of the cable holding slots can be any number defined by the available surface space and the application needs. The dimensions of the concave cavities are preferably capable of holding a plurality of cables and preferably between the sizes of cables and the sizes of cable connectors such that, when the portable device is not present at the holding means for holding portable devices, 125, any cables can be held at these cable holding slots by placing the cable connector at the other side of the cable holding slot from the body of the cable. In the meantime, when the portable devices are present at the holding means for holding portable devices, 125, the cables associated with these portable devices can be properly placed or managed along these cable holding slots to ensure that these cables won't get damaged or tangled.

Figure 96:
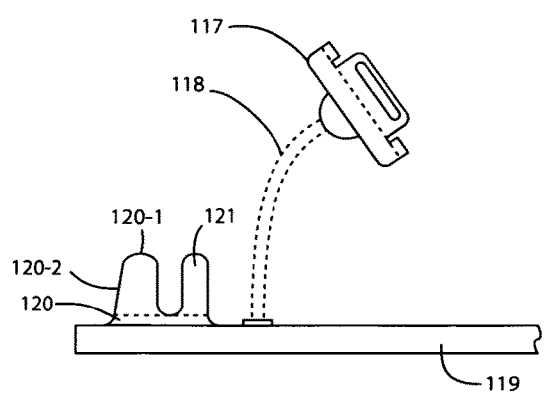
FIG. 96 illustrates the side view of a tablet stand and the cable holder on the stand.

The side view of another example of the eighty-sixth means for holding, 96, is illustrated in FIG. 96 in which numeral 117 is configured to be the same as the fortieth means for holding, 56, in which the detail embodiment is illustrated in FIGS. 35 through 48, numeral 118 is configured to be the same as the forty-first means for supporting, 56-1, in FIG. 33 and FIG. 34, numeral 119 illustrates a base, and numeral 120 illustrates the one-hundred seventeenth means for holding or a cable holder configured on a holding stand.

Figure 97:
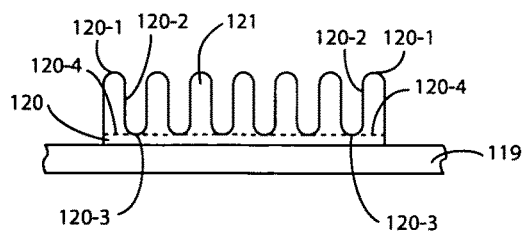
FIG. 97 illustrates the front view of the detail embodiment of a cable holder.
Figure 98:
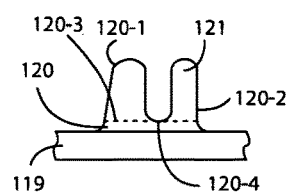
FIG. 98 illustrates the side view of the detail embodiment of a cable holder.
Figure 99:
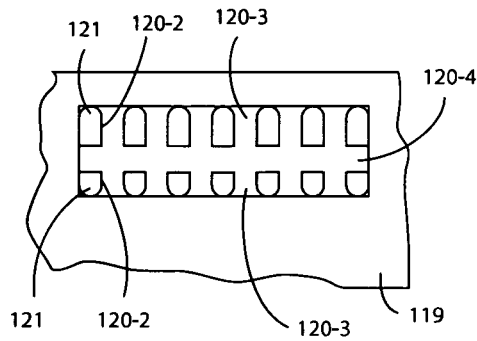
FIG. 99 illustrates the top view of the detail embodiment of a cable holder.

The front view, the side view, and the top view of the cable holder or the one-hundred seventeenth means for holding, 120, are illustrated in FIG. 97, FIG. 98, and FIG. 99, respectively, in which numeral 121 illustrates the cable holding columns, numeral 120-1 illustrates the one-hundred eighteenth means for holding or the ridge of the cable holding column, 121, numeral 120-2 illustrates the one-hundred nineteenth means for holding or the side or edge of the cable holding column, 121, numeral 120-3 illustrates the one-hundred twentieth means for holding or the first lateral cable holding valley (a valley between the left and right cable holding columns, 121, based on the front view), numeral 120-4 illustrates the one-hundred twenty-first means for holding or the second lateral cable holding valley (a valley between the front and rear cable holding columns, 121, based on the side view). The cable holding columns, 121, are extended up from the base of the cable holder, 120, and are separated by the first lateral cable holding valleys, 120-3, and the second lateral cable holding valleys, 120-4. Each of the cable holding columns, 121, is separated from the other cable holding columns, 121, by two first lateral cable holding valleys, 120-3, and two second lateral cable holding valleys, 120-4, except those cable holding columns, 121, at the corners and those cable holding columns, 121, between two corners. The cable holding column, 121, at a corner is separated from the other cable holding columns, 121, by one first lateral cable holding valley, 120-3, and one second lateral cable holding valley, 120-4, while the cable holding columns, 121, between two corner cable holding columns, 121, are separated from the other cable holding columns, 121, by one first lateral cable holding valley, 120-3, and two second lateral cable holding valleys, 120-4, or by two first lateral cable holding valleys, 120-3, and one second lateral cable holding valley, 120-4. Each of the first lateral cable holding valleys, 120-3, and the second lateral cable holding valleys, 120-4, can be configured to have any predetermined dimensions or widths. However, the widths of the first lateral cable holding valleys, 120-3, and the second lateral cable holding valleys, 120-4, are preferably between the sizes of cables and the sizes of cable connectors such that the first lateral cable holding valleys, 120-3, and the second lateral cable holding valleys, 120-4, can have the capability of holding or resting a plurality of cables within each, some, or all of them. If the number of the first lateral cable holding valleys, 120-3, and the second lateral cable holding valleys, 120-4, are appropriate, one or more than one of the widths can be larger than the size of certain cable connectors such that some cables can be hold with the cable connectors resting among the cable holding columns, 121, instead of having the cable connectors stay outside the edge of all the cable holding columns, 121. The relative orientations of the first lateral cable holding valleys, 120-3, and the second lateral cable holding valleys, 120-4, can be laid out in any appropriate angles such that the cables or cable connectors can be held by the cable holding valleys. The shapes and heights of the cable holding columns, 121, can be optimized to achieve the cable holding effectiveness and conveniences. The space created by the one-hundred twenty-first means for holding, 120-4, can also be used as the space for allowing the cables resting in the one-hundred twentieth means for holding, 120-3, to be labeled or tied. Similarly, the space created by the one-hundred twentieth means for holding, 120-3, can also be used as the space for allowing the cables resting in the one-hundred twenty-first means for holding, 120-4, to be labeled or tied.

Figure 100:
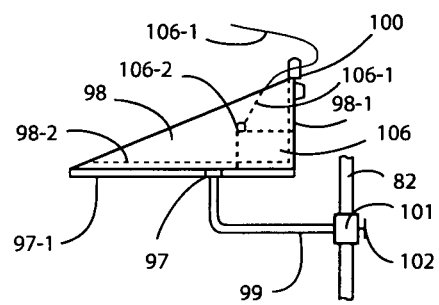
FIG. 100 illustrates the detail configuration of the side view of a rechargeable battery in a portable supporting shelf.
Figure 101:
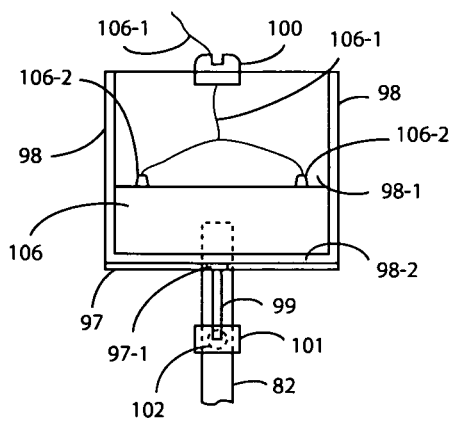
FIG. 101 illustrates the detail configuration of the front view of a rechargeable battery in a portable supporting shelf.
Figure 102:
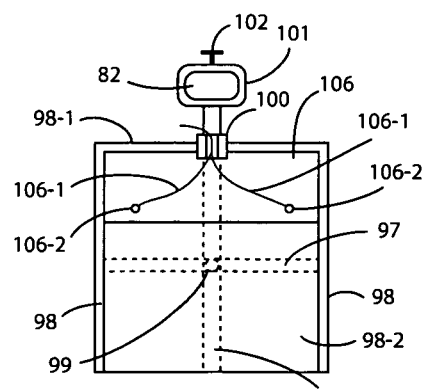
FIG. 102 illustrates the detail configuration of the top view of a rechargeable battery in a supporting shelf.

The side view, front view, and top view of the detail configuration of a rechargeable battery in a supporting shelf are illustrated in FIG. 100, FIG. 101, and FIG. 102 in which numeral 82 illustrates the seventieth means for supporting as illustrated in FIG. 78, numeral 97 illustrates a lateral support means, numeral 97-1 illustrates another lateral support means perpendicular to numeral 97, numeral 98 illustrates the shelf side panels, numeral 98-1 illustrates the shelf rear panel, numeral 98-2 illustrates the shelf base panel, numeral 99 illustrates the shelf supporting column, numeral 100 illustrates a cable holder, numeral 101 illustrates is the means for connecting to connect the shelf supporting column, 99, to the seventieth means for supporting, 82, numeral 102 illustrates a securing means, such a thumb stud, to secure the shelf supporting column, 99, to the seventieth means for supporting, 82, numeral 106 illustrates the one-hundred twenty second means for storing energy that is similar to the eightieth means for storing energy, 90, in FIG. 79, FIG. 80, and FIG. 81, numeral 106-1 illustrates an electrical current transmitting cable, numeral 106-2 illustrates the battery electric poles.

The side view, front view, and top view of the detail embodiment of the supporting portable shelves to hold the rechargeable batteries are illustrated in FIG. 103, FIG. 104 and FIG. 105 in which numeral 81 illustrates the sixth-ninth means for shelving in FIG. 78, numeral 81-1 illustrates a hollowed column in FIG. 78, numeral 103 illustrates the connection means which is further illustrated in FIG. 106, numeral 103-1 illustrates the fastening means which is typically an item such as a threaded thumb stud for tightening purpose, numeral 103-2 illustrates the smaller connection column with external cross section dimensions matching the internal cross section of the supporting mechanism of the connection means, 103, such that the smaller connection column, 103-2, can be inserted into the chamber space below the top portion, 103-3 in FIG. 106, of the connection means, 103, to move back and forth and the length of the overlap between the smaller connection column, 103-2, and the connection means, 103, determines the overall length of the combination of the connection means, 103, and the smaller connection column, 103-2, while the fastening means, 103-1, is threaded to the threads, 103-4, configured on the lower surface of the connection means, 103, such that, as the fastening means, 103-1, is tightened, the smaller connection column, 103-2, is forced up tightly against the top portion, 103-3, to stay and the length can be fixed and secured by fastening the smaller connection column, 103-2, to the connection means, 103, by tightening the fastening means, 103-1, numeral 104 illustrates the a hanging column supporting the weight of the shelves and devices connected to this hanging column, numeral 105 illustrates the means for shelving providing platforms for the portable shelves, numeral 105-1 illustrates the rear panels of the portable shelves, numeral 105-2 illustrates the base panels of the portable shelves, numeral 105-3 illustrates the side panels of the portable shelves. As illustrated in FIG. 106, the vertical length of the connection means, 103, is configured to let the smaller connection column, 103-2, be cleared of the structure of the hollowed column, 81-1.

SUMMARY, RAMIFICATION, AND SCOPE

Accordingly, it can be seen that the versatile holder and stand can greatly enhance the flexibilities of the users of portable devices as to what stand configurations or functions to be used at any time and when to use those configurations and functions. Furthermore, the versatile holder and stand provide the versatility of including the energy generation device and the energy storage units to provide the energy needs to the portable devices on the versatile stands.

Furthermore, the present invention has the additional advantages in that
- it allows a stand for mounting a large flat panel to be easily portable;
- it creates the stand configurations that allow additional space for other mounting or device-holding applications;
- it incorporates the energy generation and energy storage capabilities to a stand or stands;
- it provides the stand users tools to manage the cables for the devices;
- it introduces the stand configurations that not only allow the stand to be used for multiple purposes but also allow the stand to be dismantled and stackable to be stored in a minimal space;
- it creates a device holder that can be used to mount devices with substantial different dimensions.

Although the above detail description contains many specifications, these should not be construed as limiting the scope of the invention but as merely providing illustrations of some of the presently preferred embodiments of this invention. For example, the curve of the means for supporting (numeral 29) can be any combinations of curves or shapes, the number of the seventy-fifth means for connecting may be more than one, and all the numbers, the shapes, and the configurations as illustrated are purely for illustration purpose, while other alternative designs are feasible and inclusive in the present invention; the configuration of the energy generation means and the energy storage means are placed at certain locations and/or with certain structure merely for illustration purpose, while other placement and structure designs are feasible and inclusive in the present invention. Likewise, the design of the various ways of the versatile portable device holding means and other details are purely for illustration purposes. Thus the scope of the invention should be determined by the appended claims and their legal equivalents, rather than by the examples given.

The invention claimed is:

1. A flat-panel mount comprising:
   first means for mounting,
   second means for mounting,
   third means for securing,
   fourth means for supporting,
   fifth means configured movement
   whereby said first means for mounting comprising a sixth means for mounting and a seventh means for mounting joined by said fifth means configured for movement such that said sixth means for mounting and said seventh means for mounting are configured to independently pivot about said fifth means thereby, with said sixth means for mounting and said seventh means for mounting extended and secured by said third means for securing and said fourth means for supporting while with said second means for mounting configured at predetermined locations on said sixth means for mounting and said seventh means for mounting, said flat-panel mount being able to be reduced in size for portability and configured for mounting flat panels of various sizes.

2. A flat-panel mount as set forth in claim 1 wherein said fifth means for flexibility being a pair of hinges.

3. A device holder comprising:
   expandable holding means,
   universal handling means,
   more than one universal device-holding means,
   a support bar attached to a holder base wherein said holder base is attached to a back of the device holder, wherein said support bar further comprising a gooseneck;
   wherein said support bar configured to be attached to a tripod stand;
   whereby said expandable holding means configured to include two pieces each piece of said two pieces defining a through aperture, wherein the front and rear surfaces of the holder base are axially aligned with the respective front and rear surfaces of said two pieces; wherein a first piece of said two pieces positioned at one side of said device holder and a second piece of said two pieces positioned at the opposite side of said device holder away from said one side each of said through apertures configured for a person's hand to hold and said universal device-holding means configured separately away from said universal handling means on said expandable holding means to form a chamber with appropriate dimensions fitting a portable device thereby said universal device-holding means along with said expandable holding means configured to be pushed away from each other to appropriate positions by means of forces applied to said universal handling means configured on said expandable holding means to hold a portable device by means of said universal device-holding means.

4. A device holder as set forth in claim 3 wherein said more than one universal handling means configured on each of said expandable holding means at predetermined locations with different orientations relative to said expandable holding means, including the orientation parallel or the orientation perpendicular to said expandable holding means.

5. A device holder as set forth in claim 3 wherein said more than one universal device-holding means configured on said expandable holding means at predetermined locations with different distances away from the edge of said expandable holding means thereby said universal device-holding means being capable of holding portable devices with substantially different dimensions due to said different distances between said universal device-holding means and said edge of said expandable holding means.

\* \* \* \* \*